United States Patent
Crossman et al.

(10) Patent No.: US 12,246,913 B2
(45) Date of Patent: Mar. 11, 2025

(54) FITTING FOR A WATER TANK

(71) Applicant: RAIN HARVESTING PTY LTD, Milton (AU)

(72) Inventors: Shaun Crossman, Milton (AU); Anton Lee See, Albion (AU)

(73) Assignee: RAIN HARVESTING PTY LTD, Milton (AU)

( * ) Notice: Subject to any disclaimer, the term of this patent is extended or adjusted under 35 U.S.C. 154(b) by 344 days.

(21) Appl. No.: 17/595,372

(22) PCT Filed: May 12, 2020

(86) PCT No.: PCT/AU2020/050466
§ 371 (c)(1),
(2) Date: Nov. 15, 2021

(87) PCT Pub. No.: WO2020/227766
PCT Pub. Date: Nov. 19, 2020

(65) Prior Publication Data
US 2022/0194691 A1    Jun. 23, 2022

(30) Foreign Application Priority Data
May 16, 2019  (AU) ................. 2019901670

(51) Int. Cl.
*B01D 35/027* (2006.01)
*B01D 29/07* (2006.01)
(Continued)

(52) U.S. Cl.
CPC .......... *B65D 88/54* (2013.01); *B01D 29/071* (2013.01); *B01D 35/027* (2013.01); *C02F 1/001* (2013.01);
(Continued)

(58) Field of Classification Search
None
See application file for complete search history.

(56) References Cited

U.S. PATENT DOCUMENTS

2005/0178721 A1    8/2005  Lombardi, II
2009/0218411 A1*   9/2009  Hansen ................. B05B 1/044
                                               239/1

(Continued)

FOREIGN PATENT DOCUMENTS

AU    2019204264 A1    1/2020
KR    10-2011-0001599 A  1/2011

OTHER PUBLICATIONS

International Search Report and Written Opinon received for PCT/AU2020/050466, mailed Aug. 17, 2020.

*Primary Examiner* — Angelisa L. Hicks
(74) *Attorney, Agent, or Firm* — Greer, Burns & Crain, Ltd

(57) ABSTRACT

A fitting, and method for mounting the fitting, to a water tank including a wall defining an inlet opening. The fitting comprising a solar shield for mounting to an edge of the wall, the edge defining the inlet opening. The solar shield including a base defining a lower region; at least a first arm extending upwardly from the base, the first arm having a portion that overlies an external surface of the tank when the fitting is fitted to the tank; at least a second arm extending upwardly from the base; and, a solar shield adapted to allow fluid to pass located, wherein the solar shield is adapted to snap fit into the inlet opening when the fitting is fitted to the tank without the use of additional fasteners, joiners and/or adhesives.

22 Claims, 18 Drawing Sheets

(51) Int. Cl.
*B65D 88/54* (2006.01)
*C02F 1/00* (2023.01)
*C02F 103/00* (2006.01)
*E03B 3/03* (2006.01)
*F16L 5/10* (2006.01)
*H01B 17/58* (2006.01)
*H02G 3/08* (2006.01)
*F04D 13/06* (2006.01)
*F04D 13/08* (2006.01)

(52) U.S. Cl.
CPC ............... *E03B 3/03* (2013.01); *F16L 5/10* (2013.01); *H01B 17/583* (2013.01); *H02G 3/083* (2013.01); *C02F 2103/001* (2013.01); *F04D 13/0693* (2013.01); *F04D 13/086* (2013.01)

(56) References Cited

U.S. PATENT DOCUMENTS

| | | |
|---|---|---|
| 2011/0024341 A1 | 2/2011 | Lyon |
| 2011/0084070 A1 | 4/2011 | Martheenal |
| 2017/0246623 A1* | 8/2017 | Magnusson ........... B01L 3/0224 |

* cited by examiner

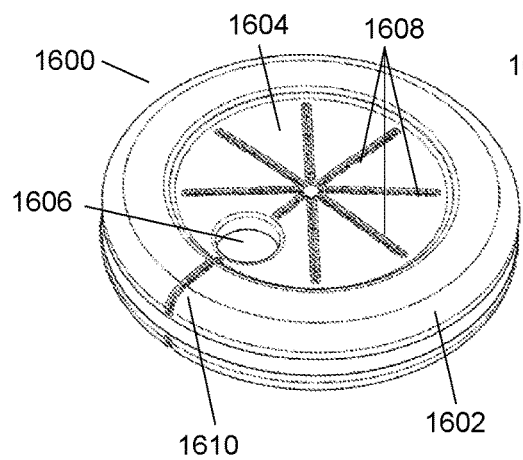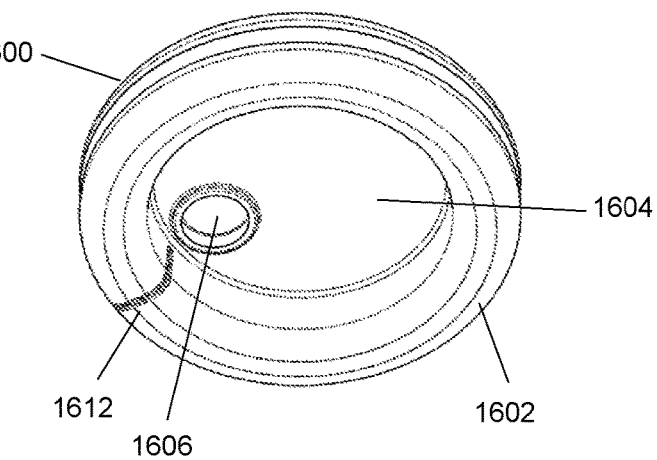
FIGURE 25
FIGURE 26
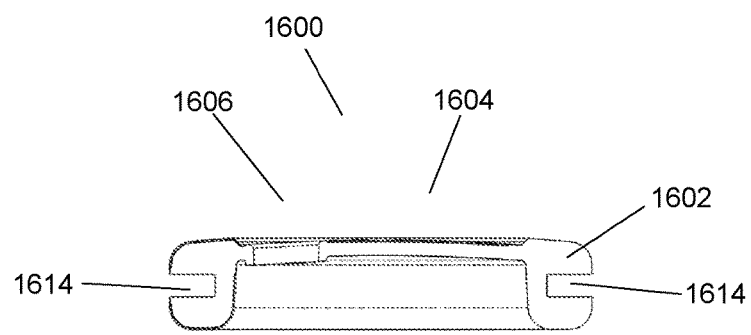
FIGURE 27

FITTING FOR A WATER TANK

TECHNICAL FIELD

The present invention relates to a fitting for a rainwater tank. In specific embodiments, the fitting comprises a screen and/or a sunshield, also known as solar shields, for use with rain water tanks.

BACKGROUND ART

A rain water tank is a container for storing rain water. Rain water tanks come in many shapes and sizes, and include a water inlet opening for allowing rain water to enter the tank. Typically, rain water is directed into the tank using a series or drains and/or pipes that funnel rain water towards the tank inlet opening and into the rain water tank for storage.

Typically, the water pipe funneling rain water into the rain water tank does not fully cover, if at all, the inlet opening once installed. This creates various problems.

One problem relates to sunlight entering the tank. In sunny locations, sunlight may enter the tank through the inlet opening. This may promote growth of microorganisms, such as algae, inside the tank. A known solution to overcome this problem, is to install a solar shield over the inlet opening. Known solar shields, shield the stored water from sunlight by at least partially covering the inlet opening while allowing rain water to enter the tank. Typically, known solar shields, however, require manual installation using screws, adhesive or other joiners, and/or are difficult or fidgety to orientate and fit over the inlet opening, especially when the inlet opening is in a position that is difficult to access.

Another problem relates to debris entering the tank through an uncovered, or partially uncovered, inlet opening. A known solution to preventing or minimising debris entering the tank is to install a mesh or screen over the inlet opening. This also assists in preventing mosquitoes from entering the tank. Such meshes or screens typically allow water to flow through and into the tank while preventing debris from entering the tank. Similar to solar shields, such meshes and screens, require manual installation using screws, adhesive or other joiners, and/or are difficult or fidgety to orientate and/or fit over the inlet opening especially when the inlet opening is in a position that is difficult to access. In addition, over time, such meshes and screens become clogged with debris and require clearing and/or replacing.

It will be clearly understood that, if a prior art publication is referred to herein, this reference does not constitute an admission that the publication forms part of the common general knowledge in the art in Australia or in any other country.

SUMMARY OF INVENTION

The present invention is directed to a fitting, such as a screen or a solar shield or both, which may at least partially overcome at least one of the abovementioned disadvantages or provide the consumer with a useful or commercial choice.

With the foregoing in view, the present invention in one form, resides broadly in a fitting for a water tank, the water tank including a wall defining an inlet opening, the fitting comprising a base portion that, in use, is located in an inner volume of the tank, the fitting being mounted in the tank by inserting the base of the fitting into the tank inlet, wherein the fitting is adapted to be mounted into the inlet opening when the fitting is fitted to the tank without the use of additional fasteners, joiners and/or adhesives.

In one embodiment, the fitting comprises a solar shield. In another embodiment, the fitting comprises a tank screen. In another embodiment, the fitting comprises a solar shield to which a tank screen can be mounted. In another embodiment, the fitting comprises a tank cover.

The fitting may be adapted to be mounted into the inlet opening by snap fitting, by virtue of a friction fit, by provision of gripping teeth on the side wall of the inlet, by a combination of a screw and complementary thread on one of the inlet of the tank and the complementary part on the fitting. In some embodiments, the fitting is provided with a snap-fit mechanism that engages with the tank when the fitting is inserted into the inlet of the tank.

In a second aspect, the present invention provides a fitting for a water tank, the water tank including a wall defining an inlet opening, the fitting comprising:
  a. a solar shield for mounting to an edge of the wall or to a mounting member mounted to the inlet, the edge defining the inlet opening, the solar shield including:
    i. a base defining a lower region,
    ii. at least a first arm extending upwardly from the base, the first arm having a portion that overlies an external surface of the tank when the fitting is fitted to the tank;
    iii. at least a second arm extending upwardly from the base; and
    iv. a solar shield adapted to allow fluid to pass through,
  wherein the solar shield is adapted to snap fit into the inlet opening or to the mounting member when the fitting is fitted to the tank without the use of additional fasteners, joiners and/or adhesives.

In one embodiment, the fitting comprises:
  a. a solar shield for mounting to an edge of the wall, the edge defining the inlet opening, the solar shield including:
    v. a base defining a lower region,
    vi. at least a first arm extending upwardly from the base, the first arm having a portion that overlies an external surface of the tank when the fitting is fitted to the tank;
    vii. at least a second arm extending upwardly from the base;
    viii. a solar shield portion adapted to allow fluid to pass through;
  wherein the at least one first arm and the at least one second arm sandwiches at least a portion of the wall of the water tank when the fitting is fitted to the tank.

Advantageously, in preferred embodiments, the solar shield is able to be snap fitted into the inlet opening when the fitting is fitted to the tank without the use of additional fasteners, joiners and/or adhesives.

As mentioned above, the solar shield includes a base. A skilled person would understand that the base may be any particular size or shape. Typically, the size and shape of the base substantially corresponds to the size and shape of the cross-sectional area of the water tank inlet opening. Usually, the shape of the base is circular or substantially circular.

As mentioned above, the solar shield further includes at least one first arm extending upwardly from the base. In some embodiments, the solar shield includes at least two or more first arms. In some embodiments, the solar shield includes at least three or more first arms. A skilled person, however, would understand that the solar shield may include any number of first arms. Generally, the larger the base the more first arms the solar shield will have. Typically, the first arms are evenly spaced round the base.

In some embodiments, each first arm may extend upwardly and outwardly or include an arm portion that extends upwardly and outwardly.

Each first arm may include at least a lower portion. Typically, the lower portion of each first arm extends vertically, or substantially vertically, from, or relative to, the base.

Each first arm may further include an upper portion. The upper portion of each first arm may extend horizontally, or substantially horizontally, from, or relative to, the corresponding lower portion. Each upper portion may also extend perpendicular, or substantially perpendicular, relative to the corresponding lower portion. In most embodiments, the portion that overlies the external surface of the tank when the fitting is fitted to the tank forms part of the upper portion of each first arm.

Each first arm may further include an intermediate portion. Usually, the intermediate portion bridges the upper portion and the lower portion. In some embodiments, the intermediate portion tapers inwardly from the upper portion towards the lower portion. Advantageously, the intermediate portion is adapted to guide the tank screen into a central position during mounting a tank screen to the solar shield.

In some embodiments, the fitting may comprise a tank screen. The tank screen may be positioned so that it is fitted at least partially into the solar shield. The solar shield may include one or more tank screen abutment surfaces for abutting one or more surfaces of the tank screen when the tank screen is mounted to the solar shield. In most embodiments, each first arm includes a tank screen abutment surface. In some embodiments, each tank screen abutment surface may form, or at least partially form, an inner surface of the upper portion of at least one of the at least one first arm. In some embodiments, each tank screen abutment surface may form, or at least partially form, an inner surface of the lower portion of at least one of the at least one first arm. In some embodiments, each tank screen abutment surface may form an inner surface of the intermediate portion of at least one of the at least one first arm. Advantageously, in preferred embodiments, the one or more tank screen abutment surfaces centrally locates the tank screen relative to the solar shield after mounting.

As mentioned above, in some embodiments the solar shield includes at least one second arm. In some embodiments, the solar shield includes at least one second arm corresponding to each first arm. Typically, each second arm is located adjacent the corresponding first arm. In alternative embodiments, the solar shield includes at least one pair of second arms corresponding to each first arm. In these embodiments, each arm of each pair of second arms is located either side of the corresponding first arm. Typically, each second arm extends upwardly and outwardly from the base.

Typically, each second arm will be shorter in length than each first arm. Typically, each second arm will not extend beyond the surface of the at least one first arm which abuts the outer surface of the water tank.

Each second arm may include a body. The body may be a resilient body. The body, or at least a portion of the body, may be adapted to deflect inwardly when the solar shield is being fitted to the water tank. Further, the body, or at least a portion of the body, may be adapted to deflect outwardly once the solar shield has been fitted to the water tank. Where the second arm is a resilient arm, the resiliency of the arm enables it to deflect outwardly once the fitting has been inserted deeply enough into the tank inlet such that the top of the second arm is below the wall of the tank that defines the tank inlet.

Each second arm may include a lower portion and an upper portion. The upper portion may be an end portion. The lower portion may be substantially elongate. In some embodiments, the lower portion may be comparatively longer than the end portion. Advantageously, in preferred embodiments, the longer the length of the lower portion the larger the potential deflection of the second arm.

The solar shield may include one or more solar shield guide surfaces for guiding the solar shield during fitting the solar shield into the water tank inlet. The one or more solar shield guide surfaces may form, or at least partially form, one or more outer surfaces of the solar shield. In some embodiments, each solar shield guide surface may form, or at least partially form, an outer surface of at least one or more of the one or more second arms. In some embodiments, each solar shield guide surface may form, or at least partially form, an outer surface of one or more end portions. Advantageously, in preferred embodiments, the one or more solar shield guide surfaces help guide the solar shield during fitting the solar shield to the water tank inlet.

The solar shield may include one or more inner tank abutment portions for abutting an inside surface of the water tank once the solar shield has been fitted to the water tank. Typically, each inner tank abutment portion may form part of each at least one second arm. In some embodiments, each second arm may include a pair of inner tank abutment portions. Typically, the two or more inner tank abutment portions are evenly spaced apart.

Each inner tank abutment portion may extend upwardly from one or more of the at least one or more second arm. Each inner tank abutment portion may extend from an end of one or more of the at least one or more second arm. Each inner tank abutment portion may extend from an upper edge of the end portion of one or more of the at least one or more second arm. Each inner tank abutment portion may be in the form of a protrusion. A skilled person would understand that each inner tank abutment portion may be any particular size or shape. In some embodiments, each inner tank abutment portion may be substantially dome shaped.

The solar shield may further include at least one third arm. The solar shield may include at least two or more third arms. Typically, the solar shield includes at least three or more third arms. Each third arm may extend upwardly and away from the base. Typically, the third arms are evenly spaced round the base.

Each third arm may include a resilient body adapted to deflect inwardly when fitting the solar shield to the water tank. The body may include at least an upper portion, that overlies an outer surface of the water tank when the fitting is fitted to the water tank, and a lower portion. The upper portion may include an abutment surface for abutting an outer surface of the water tank when the solar shield is fitted to the water tank. The third arms assist in properly locating the fitting in a centralised location relative to the inlet of the tank. The third arms may be located anywhere on the fitting and the number of third arms may vary. It is preferable that the third arms are relatively equally spaced to provide even centralizing force about the fitting.

The solar shield may further include one or more apertures, each aperture adapted to receive a fastener. Each aperture may be defined by the upper portion of each first arm. Typically, the location of each aperture corresponds to a corresponding aperture defined by the tank screen.

The solar shield may further include at least one engagement portion for engaging a corresponding engagement portion on the tank screen. In some embodiments, the solar shield will include two or more engagement portions, each engagement portion corresponding to a engagement portion located on the tank screen. In some embodiments, the solar shield will include three or more engagement portions, each engagement portion corresponding to a engagement portion located on the tank screen. Each engagement portion located on the solar shield may be a tank screen engagement portion. Typically, each of the at least one first arms will define an engagement portion.

Each engagement portion located on the tank screen may include a boss. Each boss may be substantially elongate. Each boss may include a ridge. Each ridge may include a substantially horizontal lower surface. Each ridge may include a substantially angled upper surface. Each boss may extend outwardly from an outer side of each upper portion of each first arm.

As mentioned above, the solar shield includes a solar shield portion. The solar shield portion may form, or at least partially form part of the base. A skilled person would understand that the solar shield portion may be any particular size or shape already known in the art. Typically, however, the shape and the size substantially corresponds to the cross-sectional area of the water tank inlet. In some embodiments, the solar shield is circular, or substantially circular. Typically, the solar shield portion is substantially convex-shaped.

Typically, the solar shield portion includes one or more apertures for allowing the fluid to pass through. Typically, the solar shield portion includes multiple apertures. Usually, the multiple apertures are evenly spaced around the solar shield portion. Advantageously, fluid is evenly distributed around the solar shield portion so that when the fluid enters the water tank, the fluid is distributed about an area in order to minimise aggregation of sediment that may be present in the water tank.

As mentioned above, the fitting may further include a tank screen for covering the solar shield and minimising the amount of debris allowed to enter the water tank. Optionally, the tank screen is mountable to the solar shield without the use of additional fasteners, adhesives or joiners. Optionally, the tank screen is mountable to the solar shield using fasteners, adhesives and/or joiners. The tank screen may be removably mountable to the solar shield. The tank screen may be mountable to the solar shield in a first orientation. Further, the tank screen may be mountable to the solar shield in a second orientation.

The tank screen may include a base, at least one side wall extending upwardly from the base, and a rim extending outwardly from an upper end of the at least one side wall. The rim and the at least a portion of the at least one side wall may define a channel. The at least one side wall may be a solid wall, or perforated or lined with mesh to allow water to flow through in all directions (eg, horizontally out the sides of the tank screen if the base becomes full of debris).

The base may be any size or shape. However, a skilled person would understand that the size and shape of the base substantially corresponds to the size and shape of the solar shield. In most embodiment, the base will be circular, or substantially circular.

The base may include a tank screen portion adapted to allow fluid to pass through. The tank screen portion may include one or more mesh portions. Typically, the tank screen portion is substantially convex-shaped. Advantageously, debris caught by the tank screen portion may move to the sides of the tank screen portion.

The at least one side wall of the tank screen may taper inwardly from the rim towards the base. The at least one side wall of the tank screen may include an outer surface. At least a portion of the outer surface may abut one or more tank screen abutment portions of the solar shield.

As mentioned above, a rim may extend outwardly from the tank screen side wall. The rim may include an outwardly extending portion adapted to overlie at least a portion of the upper portion of each first arm of the solar shield. The outwardly extending portion may include a downwardly extending side wall including a lower most edge. The lower most edge of the rim may abut an outer wall of the water tank. The lower most edge of the rim may abut an external surface of the water tank. Advantageously, the lower most edge of the rim may aid in locating the tank screen relative to the water tank.

The tank screen may further include one or more engagement portions for engaging a corresponding engagement portion on at least the solar shield. Each engagement portion may correspond to a corresponding engagement portion on the solar shield. In some embodiments, each tank screen includes two or more engagement portions, each engagement portion corresponding to an engagement portion on the solar shield. In most embodiments, each tank screen includes three or more engagement portions, each engagement portion corresponding to an engagement portion on the solar shield. Each engagement portion may be in the form of a solar shield engagement portion.

Each engagement portion may extend from an inner side surface of the rim of the tank screen. Each engagement portion may extend from an inner side surface of the downwardly extending wall of the rim of the tank screen. Each engagement portion may extend from an inner side surface of the downwardly extending wall of the rim towards the at least one side wall of the tank screen.

Each engagement portion may be in the form of a protrusion. Each engagement portion may be substantially elongate. Each engagement portion may include a substantially horizontal upper surface for abutting a substantially horizontal lower surface of the corresponding tank screen engagement portion. Each engagement portion may include a substantially angled lower surface. In some embodiments, there may be a predetermined number of protrusions arranged to ensure that the tank screen is oriented in a particular orientation. But the present invention also extends to embodiments where the tank screen could be inserted in any rotational position.

During fitting the tank screen to the solar shield, each solar shield engagement portion may engage a corresponding tank screen engagement portion causing each tank screen engagement portion to deflect inwardly allowing each solar shield engagement portion to pass over each corresponding tank screen engagement portion and allowing each solar shield engagement portion to then deflect back outwardly, thereby securing the tank screen to the solar shield.

The tank screen may further include one or more tabs. Each tab may extend outwardly from the rim. Typically, the number of tab corresponds to the number of tank screen engagement portions. The tabs may be evenly spaced around the rim.

The tank screen may further include one or more bores adapted to receive a tool. Each bore may be defined by one of the one or more tabs. A skilled person would understand that the bore may be any particular size or shape. For example, sized to receive the end of a screw driver. Each of the one or more bores may be closed ended. Advantageously, a tool may be inserted into each bore and used to lever the rim of the tank screen away from an outer surface of the solar shield, thereby allowing the screen tank engagement member to disengage from the corresponding solar shield engagement member facilitating the release of the tank screen from the solar shield.

The tank screen may further include one or more apertures for receiving a fastener. The one or more apertures may be configured to align with the one or more apertures located on the solar shield when the tank screen is in the second mounting orientation. Advantageously, in preferred embodiments, the tank screen may be fastened to the solar shield using one or more fasteners, in the form of one or more screws.

The tank screen may further include one or more first tactile formations. Each first tactile formation may correspond to one of the apertures for receiving a fastener. The tank screen may further include one or more second tactile formations. Each first tactile formation may correspond to the one of the bores for receiving a tool. Typically, each the first tactile and second tactile formations alternate in order around an upper surface of the rim. Typically, the one or more first tactile formations and the one or more second tactile formations are in the form of one or more ridges, or one or more depressions. A skilled person would understand that the one or more first tactile formations and the one or more second tactile formations may be any size or shape. Typically, the one or more first tactile formations are different from the one or more second tactile formations. Advantageously, a user is able to feel via touch the orientation of the tank screen without sight. The tactile formations may also be decorative in nature to provide aesthetic appeal.

In a fourth form, the present invention resides broadly in a method of mounting a fitting to a water tank including a wall defining an inlet opening, the method comprising:
 a. mounting a solar shield to an edge of the wall, the edge defining the inlet opening, the solar shield including:
  i. a base defining a lower region,
  ii. at least a first arm extending upwardly from the base, the first arm having a portion that overlies an external surface of the tank when the fitting is fitted to the tank;
  iii. at least a second arm extending upwardly from the base; and
  iv. a solar shield adapted to allow fluid to pass through;
 wherein the solar shield is adapted to snap fit into the inlet opening when the fitting is fitted to the tank without the use of additional fasteners, joiners and/or adhesives.

In a fifth form, the present invention resides broadly in a method of mounting a fitting to a water tank including a wall defining an inlet opening, the method comprising:
 a. mounting a solar shield to an edge of the wall, the edge defining the inlet opening, the solar shield including:
  i. a base defining a lower region,
  ii. at least a first arm extending upwardly from the base, the first arm having a portion that overlies an external surface of the tank when the fitting is fitted to the tank;
  iii. at least a second arm extending upwardly from the base; and
  iv. a solar shield adapted to allow fluid to pass through;
 wherein the at least one first arm and the at least one second arm sandwich at least a portion of the wall of the water tank when the fitting is fitted to the tank.

In a sixth form, the present invention provides a method of mounting a fitting to a water tank including a wall defining an inlet opening, the method comprising inserting a fitting as described with reference to the first aspect of the invention, into the tank inlet until the fitting is mounted to the tank without the use of additional fasteners, joiners and/or adhesives. In some embodiments, the fitting snap-fits to the tank.

The method may further comprise mounting a tank screen to the solar shield.

The method may further comprise detaching the tank screen from the solar shield.

Any of the features described herein can be combined in any combination with any one or more of the other features described herein within the scope of the invention.

In accordance with another aspect, the present invention relates to a fitting for a water tank including at least one inlet opening defined by at least one edge of the water tank, the fitting including:
 at least one mounting member for mounting to the at least one edge of the water tank; and
 a tank screen or an inlet cover or a solar shield for mounting to one of the at least one mounting member,
 wherein each mounting member is adapted to be mounted into the inlet opening of the water tank and the tank screen or inlet cover or solar shield is adapted to be mounted onto one of the at least one mounting members without the use of additional fasteners, joiners and/or adhesives.

The mounting member may be adapted to be mounted into the inlet opening by snap fitting, by virtue of a friction fit, by provision of gripping teeth on the side wall of the inlet, by a combination of a screw and complementary thread on one of the inlet of the tank and the complementary part on the mounting member or by a clip arrangement. In some embodiments, the mounting member is provided with a snap-fit mechanism that engages with the tank when the mounting member is inserted into the inlet of the tank.

Similarly, the tank screen or inlet cover or solar shield may be adapted to be mounted into the mounting member by snap fitting, by virtue of a friction fit, by provision of gripping teeth on the side wall of the mounting member, by a combination of a screw and complementary thread on one of the mounting member and the complementary part on the tank screen or inlet cover. In some embodiments, the tank screen or inlet cover or solar shield is provided with a snap-fit mechanism that engages with the mounting member when the tank screen or inlet cover is inserted into the mounting member.

In another embodiment, the mounting member may be mounted to the water tank by use of fasteners, such as screws, or by use of adhesive. In this embodiment, the tank fitting is connected to the mounting member without requiring separate fasteners, thereby allowing for easy fitment and removal of the tank fitting to the mounting member.

The at least one mounting member may be substantially circular. The at least one mounting member may be, or at least substantially be, ring shaped. Typically, the mounting member may be permanently mountable to the at least one edge of the water tank inlet opening. Alternatively, the mounting member may be removably mountable to the water tank inlet opening. Advantageously, in steel or metal tanks, the mounting member covers the at least one edge which is typically sharp and also provides a universal mounting means for various attachment parts, such as the tank screen or inlet cover.

The at least one mounting member may include at least one side wall and at least one flange extending from the at least one side wall. The flange may extend from an upper edge of the at least one side wall. The at least one mounting member may include at least one abutment surface for abutting an exterior surface of the water tank. The at least one flange may include the at least one abutment surface for abutting an exterior surface of the water tank. The at least one flange may include at least one lower surface. The at least one lower surface may be the at least one abutment surface. The at least one mounting member may further include at least one guide surface for guiding the at least one mounting member during mounting to the inlet. The at least one side wall may include the at least one guide surface. The at least one side wall may taper outwardly from a free edge and towards the flange.

In one embodiment, the mounting member includes a surface that overlies an outside surface of the tank, the surface of the mounting member receiving one or more fasteners to fix the mounting member to the water tank or an adhesive located between the surface of the mounting member and the outer surface of the water tank fixing the mounting member to the water tank.

In another aspect, the present invention provides a mounting member for fitting to an inlet of a water tank, the mounting member having an opening for receiving a fitting for a water tank, the fitting comprising a base portion that, in use, is located in an inner volume of the water tank, the fitting being mounted in the tank by inserting the base of the fitting through the opening of the mounting member into the tank inlet, wherein the fitting is adapted to be mounted into the mounting member without the use of additional fasteners, joiners and/or adhesives.

In one embodiment, the fitting comprises a base defining a lower region, at least a first arm extending upwardly from the base, the first arm having a portion that overlies an external surface of the tank when the fitting is fitted to the tank, and at least a second arm extending upwardly from the base, wherein the fitting is adapted to snap fit into the inlet opening or to the mounting member when the fitting is fitted to the tank without the use of additional fasteners, joiners and/or adhesives.

In one embodiment, the fitting comprises a base defining a lower region, at least a first arm extending upwardly from the base, the first arm having a portion that overlies an external surface of the tank when the fitting is fitted to the tank, and at least a second arm extending upwardly from the base, wherein the at least one first arm and the at least one second arm sandwiches at least a portion of the wall of the water tank when the fitting is fitted to the tank.

The fitting may comprise a mounting ring, solar shield, a tank screen or a cover. In embodiments where the fitting is a mounting ring, the mounting ring may have an open base, with the base being defined by the lowermost portions of the mounting ring that extend into the tank when the mounting ring is fitted to the tank.

In one embodiment, the mounting member comprises a mounting ring having an annular region, a flange that, in use, overlies an outer surface of the water tank, a downwardly extending wall, one or more flexible arms extending outwardly from the downwardly extending wall, wherein when the mounting ring is inserted into the inlet of the tank, the one or more flexible arms flex inwardly due to contact with the inlet and spring outwardly once an upper end of the one or more flexible arms is within the tank such that a wall of the inlet of the tank is located between the upper end of the one or more flexible arms and the flange to thereby mount the mounting ring to the tank. In some embodiments, the mounting ring has one or more apertures in the flange to accept fasteners, such as screws, to mount the mounting ring to the tank in instances where the inlet of the tank does not allow the one or more flexible arms to mount the mounting ring to the inlet. This may be useful, for example, where the tank has a thick wall in the vicinity of the inlet and the thickness of the tank wall is larger than the gap between the upper ends of the one or more flexible arms and the flange. The at least one mounting member may include one or more protrusions extending from an outer surface of the at least one side wall. Each protrusion may include an angled side wall. Each protrusion may include an upper abutment surface for abutting an interior surface of the water tank once mounted to the water tank inlet. Advantageously, in use, the at least one abutment surface of the flange and the upper abutment surfaces of the protrusions may sandwich a wall that defines the at least one edge of the water tank once the mounting member is mounted to the inlet opening in order to securing the mounting member to the water tank.

The at least one mounting member may include one or more recesses for locating at least a portion of a solar shield or a screen. In some embodiments, each at least one mounting member includes two or more recesses. Typically, each at least one mounting member will have three recesses. Typically, the recesses will be evenly spaced around a perimeter of the mounting member. Typically, the at least one flange of the mounting member will define the at least one or more recesses. Each at least one recess may be substantially elongate. Each at least one recess may extend around a portion of the perimeter of the flange. Each recess may extend from an outer perimeter edge of the flange and toward the centre of the mounting member. Each recess may be in the form of a seat for seating at least a portion of a solar shield.

The at least one mounting member may include one or more locating portions for locating a solar shield, a tank screen or an inlet cover. In some embodiments, the at least one mounting member may include two or more locating portions for locating a solar shield, a tank screen or inlet cover. Typically, each at least one mounting member will have three locating portions for locating a solar shield, a tank screen or inlet cover. Typically, the locating portions will be evenly spaced around the perimeter of the mounting member. Typically, the location of each locating portion will correspond to, or substantially correspond to, the location of at least one protrusion. Typically, the location of each locating portion will correspond to, or substantially correspond to, the location of at least one pair of protrusions.

Each locating portion may include one or more locating recesses. Typically, each portion includes a pair of locating recesses. Typically, each recess is defined by at least a portion of the outwardly extending flange. Typically, each pair of locating recesses is separated by a dividing member. Typically, each recess may include at least one abutment surface for abutting at least a portion of the tank screen or inlet cover.

Each locating portion may further include at least one engagement portion as substantially described above. Each engagement portion may be an inlet cover engagement portion for engaging a corresponding engagement portion on the mounting member or a tank screen engagement portion for engaging a corresponding engagement portion on the tank screen.

Each mounting member may include one or more apertures adapted to receive a fastener. In some embodiments, each mounting member includes two or more apertures adapted to receive a fastener. Typically, each mounting member includes three apertures adapted to receive a fastener. Typically, the apertures are evenly spaced around the perimeter of the mounting member. Typically, each dividing member defines the at least one aperture.

As mentioned above, the fitting includes a tank screen or inlet cover. Advantageously, the tank screen covers the water tank inlet opening and minimises the amount of debris allowed to enter the water tank. Optionally, the tank screen is mountable to the mounting member without the use of additional fasteners, adhesives or joiners. Optionally, the tank screen is mountable to the mounting member using fasteners, adhesives and/or joiners. The tank screen may be removably mountable to the mounting member.

The tank screen may include any one or more of the features of the tank screen described above in relation to other aspects of the present invention. In addition, the tank screen may include one or more engagement portions. Each engagement portion may be in the form of a mounting member engagement portion.

As described in relation to another aspect of a tank screen above, the tank screen may include a rim defining a channel. The channel may be defined by at least a lower surface of the outwardly extending flange for receiving at least a portion of the mounting member and/or a solar shield. The channel defined by the rim may be any particular size or shape suitable for overlying at least a portion of the mounting member and/or a solar shield.

As mentioned above, the fitting may include an inlet cover. The inlet cover may be any suitable size or shape. Typically, the inlet cover will be circular or substantially circular. The inlet cover may include at least one upper wall. The upper wall may be solid or at least substantially solid. Advantageously, when the inlet cover is mounted to a mounting member, entry though the mounting member is prevented.

The inlet cover may include at least one downwardly extending side wall. Typically, the downwardly extending side wall extend around the perimeter of the upper wall. The downwardly extending side wall may include an inner facing surface.

The inlet cover may include one or more engagement portions, each for engaging a corresponding engagement portion on the mounting member. The one or more engagement portions may the same, or substantially the same, as the one or more engagement portions on the tank screen as described above. Advantageously, the inlet cover may be mounted to the mounting member when the tank screen is not. Each engagement portion may extend inwardly from the inwardly facing surface of the side wall extending from the upper wall.

The inlet cover may include at least one or more tabs as described above. The one or more tabs may extend from a rim of the upper wall of the inlet cover.

The inlet cover may include at least one or more bores for receiving a tool. In preferred embodiment, each bore may be the same or similar to the one or more bores as described in relation to the tank screen above.

The inlet cover may include one or more tactile portions as described above in relation to the tank screen. Each tactile portion may correspond to a bore or an aperture or both. Each tactile portion may be in the form of one or more depressions, bosses, ridges or the alike.

The inlet cover may include one or more apertures, the same or similar to the one or more apertures as described in relation to the tank screen above, for receiving a fastener. Each aperture may correspond to an aperture in the mounting member such that when mounted to the mounting member, each aperture for receiving a fastener in the inlet cover corresponds to an aperture for receiving a fastener in the mounting member. Advantageously, in use, one or more fasteners may be used to fasten the inlet cover to the mounting member.

The inlet cover may further include one or more areas of weakness. Typically, each area of weakness may form part of the upper wall. The one or more areas of weakness may be any particular size or shape. Typically, each area of weakness may be, or may substantially be, circular. Each area of weakness may be in the form of one or more recesses. Each recess may extend downwardly from an upper surface of the upper wall but not extend through the upper wall. Advantageously, each area of weakness may be easily cut out to allow for installation of cables, pipes or the alike. The area of weakness may be delineated by a region of reduced wall thickness. The area of weakness may also be located in a raised region on the cover.

The areas of weakness may enable holes to be easily and accurately cut in the cover. In one embodiment, one hole formed in the cover may be used to have a pipe for a submersible pump to pass therethrough. In another embodiment, one hole formed in the cover may be used to have a power cable for a submersible pump pass therethrough. The hole or holes formed in the cover may be fitted with a grommet. The grommet may be made from a rubber, such as a synthetic rubber or a natural rubber, or from a soft and flexible polymeric material. The grommet may comprise an annular outer region having a top wall. The annular outer region may have a circumferential channel extending therearound. The edge of the hole may extend into the channel when the grommet is fitted to the hole. The grommet may have an opening for a power cable. The grommet may have one or more flaps formed in top wall or cut into the top wall. Alternatively, the grommet may have one or more radial guidelines on the top wall, the one or more radial guidelines forming guides for cutting flaps or triangles into the top wall. A pipe may be inserted through the grommet to push the flaps downwardly. A seal that is sufficiently good to prevent mosquitoes entering the water tank through the openings in which the power cable and the pipe for the submersible pump pass can be achieved by using the grommet.

The fitting may further include a solar shield. The solar shield may include a base. The solar shield may include one or more solar shield portions as substantially described above. In use, at least a portion of the solar shield may rest upon a portion of the at least one mounting member.

The solar shield may include at least one upwardly extending arm. Typically, the solar shield will include three upwardly extending arms. Typically, the upwardly extending arms will be evenly spaced around a perimeter of the base. Typically, the location of each upwardly extending arm around the base will correspond to the location of the solar shield recesses of the mounting member. Typically, each arm will be substantially hook-shaped. Typically, the size and shape of at least a portion of each upwardly extending arm will correspond to the size and shape of each solar shield recess of the mounting member. Typically, each upwardly extending arm, or at least a portion of the upwardly extending arm, is resilient.

Each upwardly extending arm may include a side wall extending upwardly from the solar shield base and an outwardly extending flange extending from an upper end of the side wall. Typically, each outwardly extending flange and/or side wall is resiliently formed. Each outwardly extending flange may be, or substantially be, L-shaped. Each outwardly extending flange together and at least a portion of the side wall may define a space for receiving a portion of the mounting member. During mounting the solar shield to the mounting member, each at least one outwardly extending flange may deflect outwardly such that a portion of the mounting member may enter the space or channel defined by at least a portion of the side wall and outwardly extending flange of each arm. In use, each outwardly extending flange may overlie at least a portion of the mounting member flange.

The solar shield may include one or more protrusions for locating the solar shield relative to the tank screen. Each one or more protrusions may be any size or shape suitable for levering at least a portion of the side wall outwardly thereby momentarily enlarging the channel defined by the outwardly extending flange and at least a portion of the side wall. Typically, each protrusion will be sized such that it is receivable within the channel defined by the tank screen or inlet cover. Typically, each protrusion is substantially elongate. Typically, each protrusion extends upwardly from an upper surface of the solar shield. Typically, each protrusion extends upwardly from an upper surface of each outwardly extending flange. Advantageously, each protrusion may be used to deflect the side wall of each arm inwardly such that the portion of the mounting member received within the channel defined by at least a portion of the side wall and outwardly extending flange of each arm is released.

In another aspect, the present invention provides a method for fitting a fitting to a water tank, the water tank including at least one inlet opening defined by at least one edge of the water tank, the method comprising
mounting at least one mounting member to the at least one inlet of the water tank; and
mounting a tank screen or an inlet cover or a solar shield to one of the at least one mounting member,
wherein each mounting member is adapted to be mounted into the inlet opening of the water tank and the tank screen or inlet cover or solar shield is adapted to be mounted onto one of the at least one mounting members without the use of additional fasteners, joiners and/or adhesives.

In one embodiment of this method, the mounting member is mounted to the inlet without the use of additional fasteners, joiners and/or adhesives. In another embodiment, the mounting member is mounted to the inlet using fasteners, such as screws, or by an adhesive. This embodiment is useful in instances where the thickness of the wall of the inlet or the design of the inlet makes it impractical to mount the mounting member to the inlet without the use of additional fasteners, joiners and/or adhesives.

In another aspect, the present invention relates to a fitting for a water tank including at least one inlet opening defined by at least one edge of the water tank, the fitting including:
at least one mounting member for mounting to the at least one edge;
a solar shield or a tank screen or an inlet cover for mounting to the at least one mounting member;
wherein the at least one mounting member is adapted to be mounted to the water tank and extend into the inlet of the water tank and the solar shield or tank screen or inlet cover is adapted to overlie at least a portion of the at least one mounting member. In some embodiments, the solar shield or tank screen or inlet cover are adapted to lock to the mounting member without the use of additional fasteners, joiners and/or adhesives, although the present invention also allows for the possibility of embodiments where additional fasteners, joiners and/or adhesives are used to affix the solar shield or tank screen or inlet cover to the mounting member. The mounting member may releasably lock into the inlet opening. In one embodiment, the at least one mounting member is adapted to lock into the at least one inlet opening without the use of additional fasteners, joiners and/or adhesives. The solar shield, tank screen and tank cover may be as described herein.

In another aspect, the present invention relates to a fitting for a water tank including at least one inlet opening defined by at least one edge of the water tank, the fitting including:
at least one mounting member for mounting to the at least one edge, the mounting member including at least one engagement portion for engaging an engagement portion of a solar shield or a tank screen or inlet cover;
wherein each mounting member is adapted to lock into the inlet opening without the use of additional fasteners, joiners and/or adhesives. The mounting member may releasably lock into the inlet opening and a solar shield or tank screen or inlet cover may releasably lock to the mounting member.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 25 shows a top perspective view of a grommet suitable for use in embodiments of the present invention.

FIG. 26 shows a bottom perspective view of the grommet shown in FIG. 25.

FIG. 27 shows a cross-sectional view of the grommet shown in FIG. 25.

DESCRIPTION OF EMBODIMENTS

A first preferred embodiment of the present invention, in the form of a solar shield and screen fitting 100 for a water tank 102, is shown in FIGS. 1 to 10. As can be best seen in FIGS. 7 to 10, water tank 102 includes a wall 104 defining an inlet opening. The water tank 102 is a metal or steel tank. The fittings of the present invention may also be used with plastic water tanks, although the inlet design of plastic water tanks will be different to steel tanks. In particular, the inlet of a plastic water tank will normally have a thicker wall thickness than a steel tank, or the inlet of a plastic tank will have an inwardly extending lip extending into the tank.

Figure 1:
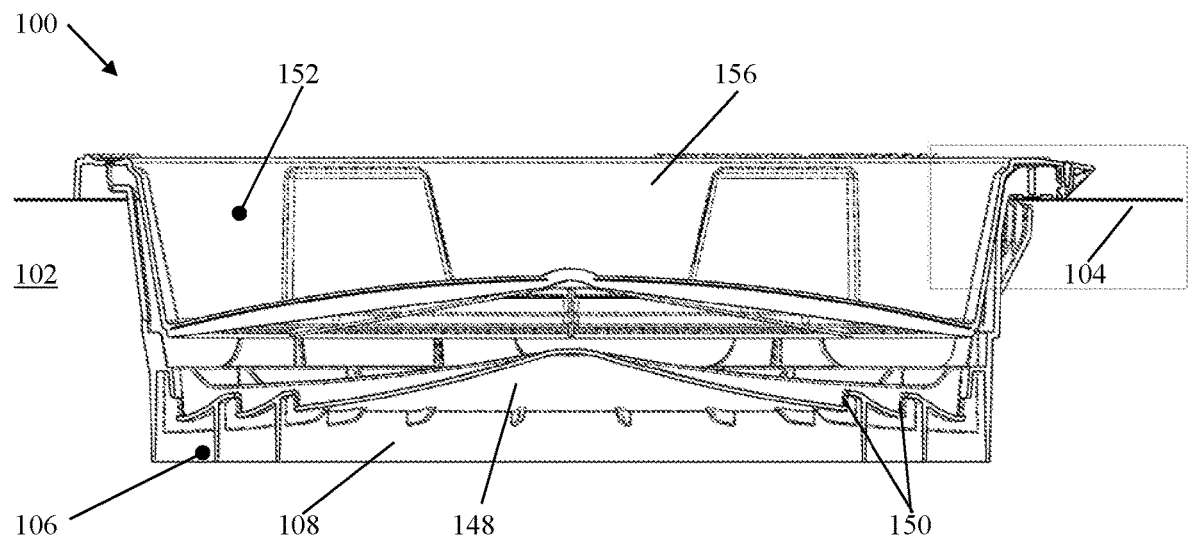
FIG. 1 shows a cross section of a preferred embodiment of the present invention in a first orientation.
Figure 1A:
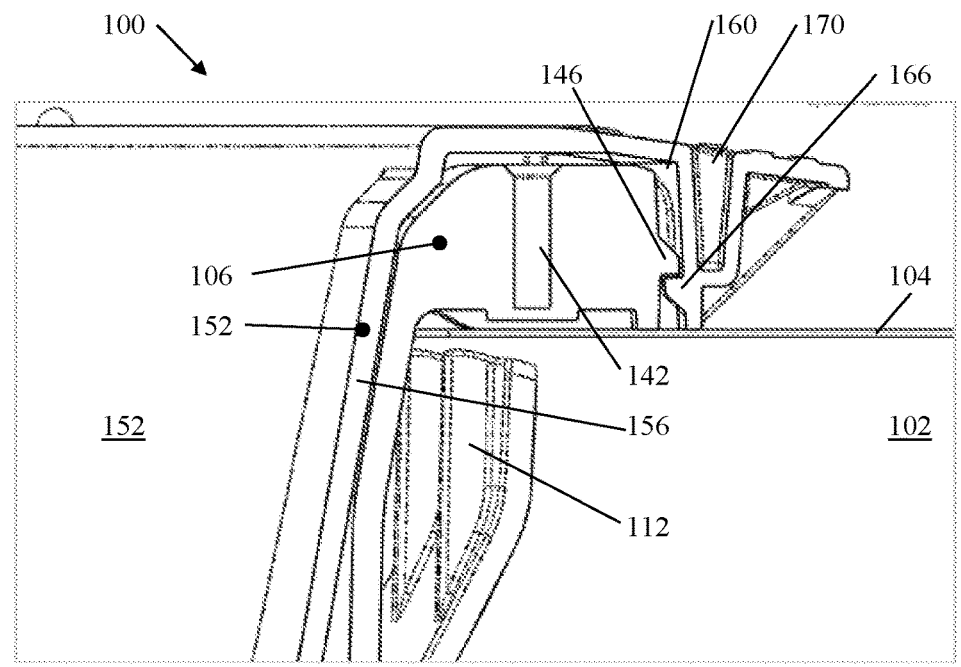
FIG. 1A shows an enlarged cross section portion of the preferred embodiment of the present invention shown in FIG. 1.
Figure 2:
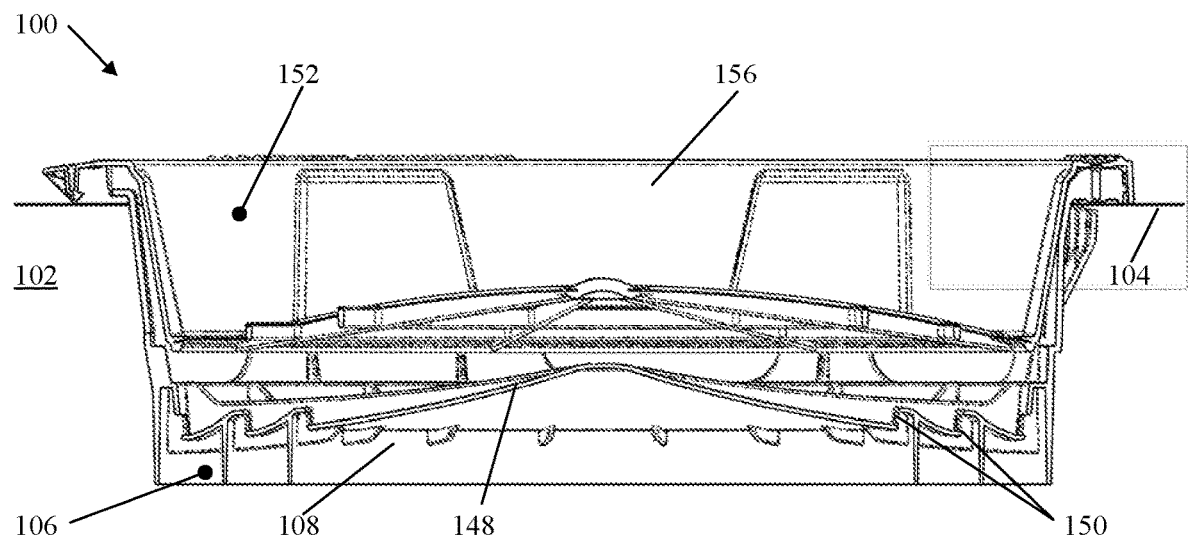
FIG. 2 shows a cross section of the preferred embodiment of the present invention in a second orientation.

Turning to FIGS. 1 and 2, fitting 100 includes a solar shield 106 for mounting to an edge of wall 104, the edge of the wall defining the inlet opening. As can best be seen in FIGS. 3 and 4, solar shield 106 includes a base 108 defining a lower region, and three a first arms 110a, 110b, 110c extending upwardly from the base. Each first arm 110a, 110b, 110c includes a portion that overlies an external surface of wall 104 of the tank when the fitting 100 is fitted to the tank 102. The solar shield 106 further includes three pairs of second arms 112a, 112b, 112c extending upwardly from the base, and a solar shield portion 114 adapted to allow fluid to pass through. The number of second arms can vary from that shown in the drawings. As best shown in FIGS. 1-2, the first arms and the seconds arms, together, sandwich a portion of wall 104 of water tank 102 when the fitting is fitted to the tank. Advantageously, the preferred embodiment shown, the solar shield 106 is able to be snap fitted into the inlet opening when the fitting 100 is fitted to the tank without the use of additional fasteners, joiners and/or adhesives in a first orientation (as best shown in FIGS. 1 and 1a). In other embodiments, an alternative to the snap fit arrangement shown in the drawings may be provided. For example, the fitting might be friction-fitted into the opening, or the fitting may be provided with a screw or thread that can engage with a complementary thread or screw formed in a lip or wall extending around the inlet opening of a plastic tank, or the inlet or the fitting may be provides with a plurality of gripping teeth to grip or engage with the opening.

Turning back to FIGS. 3 and 4, in the preferred embodiment shown, base 108 is substantially circular. In other preferred embodiments, a skilled person would understand that the shape of the base may be any suitable shape, for example, any shape that substantially corresponds to the shape of the cross-sectional area of the water tank inlet opening to which solar shield 106 is to be attached. Similarly, in other preferred embodiments, a skilled person would understand that the size of base 108 may be any suitable size, for example, of a size substantially correspond to the size of the cross-sectional area of the water tank inlet opening to which solar shield 106 is to be attached.

As mentioned above, in the preferred embodiment shown, solar shield 106 includes three first arms 110a, 110b, 110c extending upwardly from base 108. In other embodiments, a skilled person however, would understand that the solar shield may include any number of first arms 110. Generally, the larger the base the more first arms 110 a particular embodiment will have.

Each first arm 110 includes a lower portion 116. As can best be seen in FIG. 4, the lower portion of each first arm 110 extends vertically from base 108.

Each first arm further 110 includes an upper portion 118 which extends perpendicularly and outwardly relative to lower portion 116. The portion that overlies external surface 103 of tank 102 when fitting 100 is fitted to the tank forms part of each upper portion 118 of each first arm 110.

Each first arm 110 further includes an intermediate portion 120. Each intermediate portion 120 bridges upper portion 118 and lower portion 116. Each intermediate portion 120 tapers inwardly from upper portion 118 towards lower portion 116. Advantageously, the intermediate portions 120 are adapted to guide tank screen 152 into a central position during mounting tank screen 152 to solar shield 106.

Solar shield 106 includes tank screen abutment surfaces 122 for abutting one or more external surfaces of the tank screen when the tank screen 152 is mounted to the solar shield 106. In the preferred embodiment shown, each first arm 110 includes a tank screen abutment surface. Each tank screen abutment surface 122 partially forms an inner surface of the intermediate portion 120 of each first arm 110.

Advantageously, in preferred embodiments, the tank screen abutment surfaces 122 centrally locate the tank screen 152 relative to solar shield 106 after mounting (as shown best in FIGS. 1 and 2).

As mentioned above, solar shield 106 includes three pairs of second arms 112a, 112b, 112c. Each pair of second arms 112 corresponds to a first arm 110. As can best be seen in FIG. 3, each arm of each pair of second arms 112 is located either side of a corresponding first arm 110.

Figure 4:
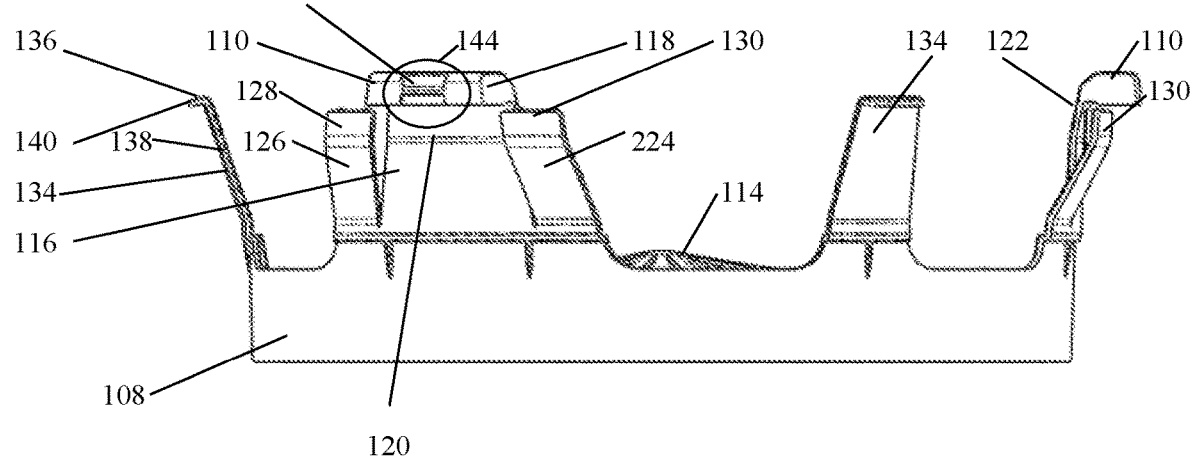
FIG. 4 shows a side view of the solar shield shown in FIG. 3 in accordance with the preferred embodiment of the present invention.

As best seen in FIG. 4, each second arm 112 extends upwardly and outwardly from base 108. In addition, each second arm 112 is shorter (in length) than each first arm 110. In preferred embodiments, each second arm 112 does not extend beyond the surface of first arms 110 which abuts the outer surface of water tank 102.

Each second arm 112 includes a resilient body 224. In preferred embodiments, each body 224, or at least a portion of each body 224, is adapted to deflect inwardly when the solar shield is being fitted to the water tank and adapted to deflect outwardly once solar shield 106 has been fitted to water tank 102.

Each second arm 112 includes a lower portion 126 and an upper portion 128, in the form of an end portion. Each lower portion 126 is substantially elongate and is competitively longer than the end portion. Advantageously, in preferred embodiments, the longer the length of the lower portion the larger the deflection of the second arm.

Solar shield 106 further includes solar shield guide surfaces 130 for guiding the solar shield during fitting the solar shield into the water tank inlet. The solar shield guide surfaces 130 at least partially form an outer surface of an end portion of each second arm 112. Advantageously, in preferred embodiments, the solar shield guide surfaces 130 help guide the solar shield during fitting the solar shield to the water tank inlet.

Solar shield 106 further includes inner tank abutment portions 132 for abutting an inside surface 101 of water tank 102 once the solar shield 106 has been fitted to the water tank. In the embodiment shown, each inner tank abutment portion 132 forms part of second arms 112. In the embodiment shown, each second arm 112 includes a pair of inner tank abutment portions 132 which are along an upper edge of an upper portion 128 of each second arm 112.

Each inner tank abutment portion 132 extends upwardly from an upper edge of each second arm 112. In the preferred embodiment shown, each inner tank abutment portion 132 is in the form of a substantially dome-shaped protrusion. A skilled person, however, would understand that in other preferred embodiments, each inner tank abutment portion may be any size or shape. The protrusions may increase stiffness. The protrusions may form ribs.

Solar shield 106 further includes three third arms 134a, 134b, 134c. As can best be seen in FIG. 3, third arms 134a, 134b, 134c are evenly spaced round base 108 and extend upwardly and away therefrom.

In preferred embodiments, each third arm 134 includes a resilient body 134 adapted to deflect inwardly when fitting the solar shield 106 to the water tank 102. Each resilient body 134 includes an upper portion 136, that overlies an outer surface of the water tank when the fitting is fitted to the water tank, and a lower portion 138. Each upper portion 136 includes an abutment surface 140 for abutting the outer surface of the water tank 102 when the solar shield 106 is fitted to the water tank 102.

The solar shield 106 further includes three apertures 142. Apertures 142 are adapted to receive a fastener (not shown). Each aperture 142 is defined by the upper portion 118 of each first arm 110. The location of each aperture 142 corresponds to a corresponding aperture defined by the tank screen.

The solar shield 106 further includes three tank screen engagement portions 144, each for engaging a corresponding solar shield engagement portion. Each tank screen engagement portion 144 forms part of each of one of first arms 110.

Each tank screen engagement portion 144 includes a boss 146. As can best be seen in FIG. 4, each boss 146 is substantially elongate and is substantially ridge shaped. As can best be seen in FIG. 1A, each boss 146 includes a substantially horizontal lower surface and a substantially angled upper surface. Each boss 146 extends outwardly from an outer side of each upper portion 118 of each first arm 110.

As mentioned above, solar shield 106 includes a solar shield portion 148. In the preferred embodiment shown, solar shield portion 148 forms part of base 108.

Solar shield portion 148 includes apertures 150 for allowing the fluid to pass through. Apertures 150 are evenly spaced around the solar shield portion 148. Advantageously, fluid is evenly distributed around the solar shield portion so that when the fluid enters into the water tank, the fluid is distributed about an area in order to minimise aggregation of sediment that may be present in the water tank.

Figure 2A:
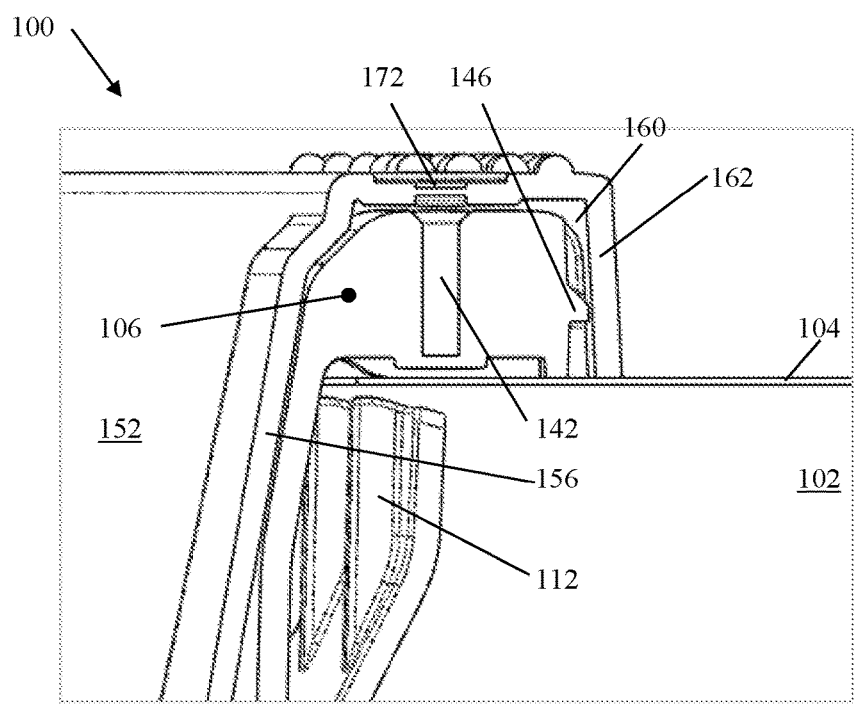
FIG. 2A shows an enlarged cross section portion of the preferred embodiment of the present invention shown in FIG. 2.
Figure 3:
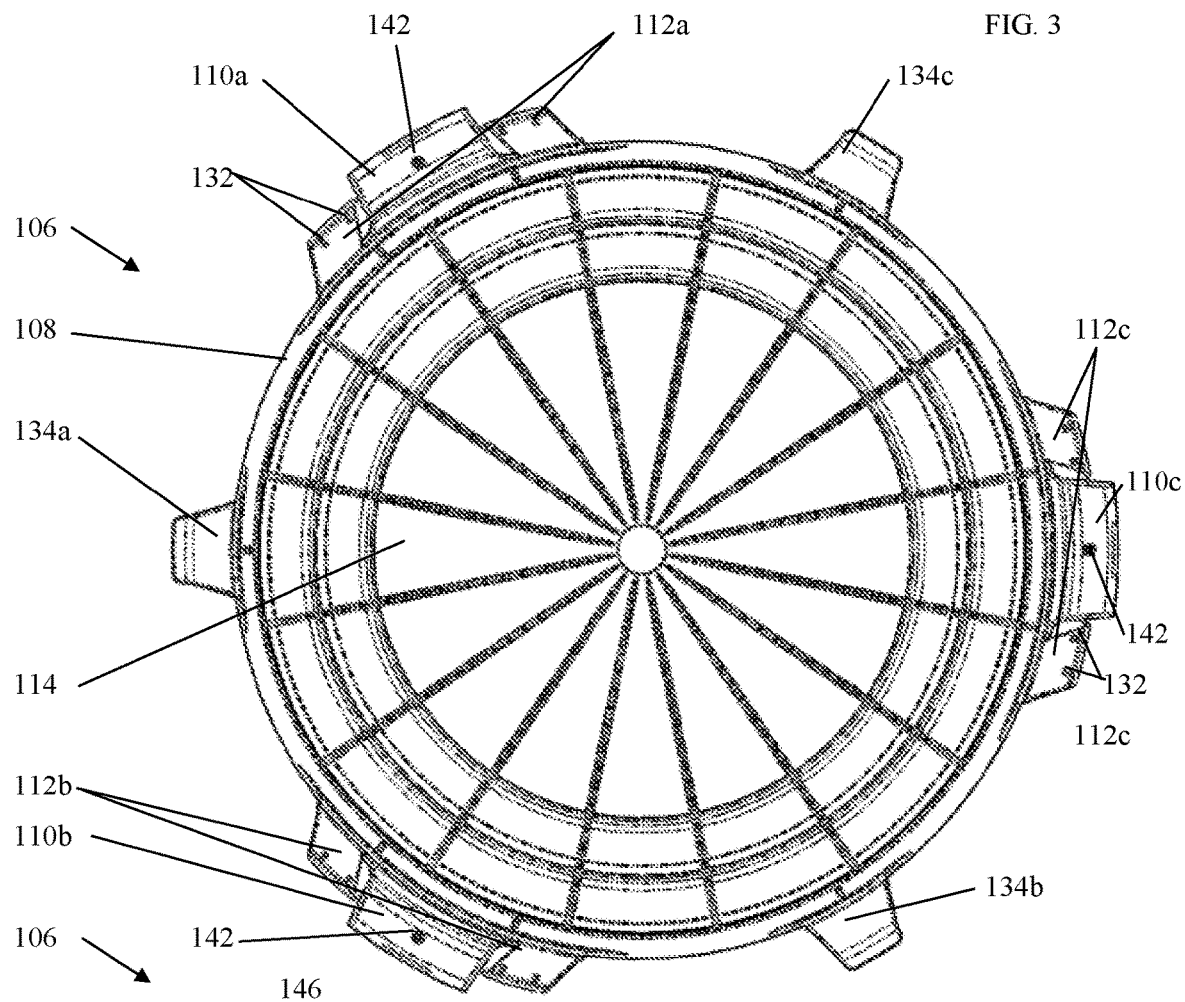
FIG. 3 shows a top view of the solar shield, as shown in FIGS. 1 and 2, in accordance with the preferred embodiment of the present invention.

The fitting further includes a tank screen 152 for covering the solar shield 106 and minimising the amount of debris allowed to enter the water tank. As best shown in FIGS. 1 and 1A, tank screen 152 is removably mountable to solar shield 106 without the use of additional fasteners, adhesives or joiners, in a first orientation. As best shown in FIGS. 2 and 2A, tank screen 152 is removably mountable to the solar shield using fasteners, in a second orientation.

Figure 5:
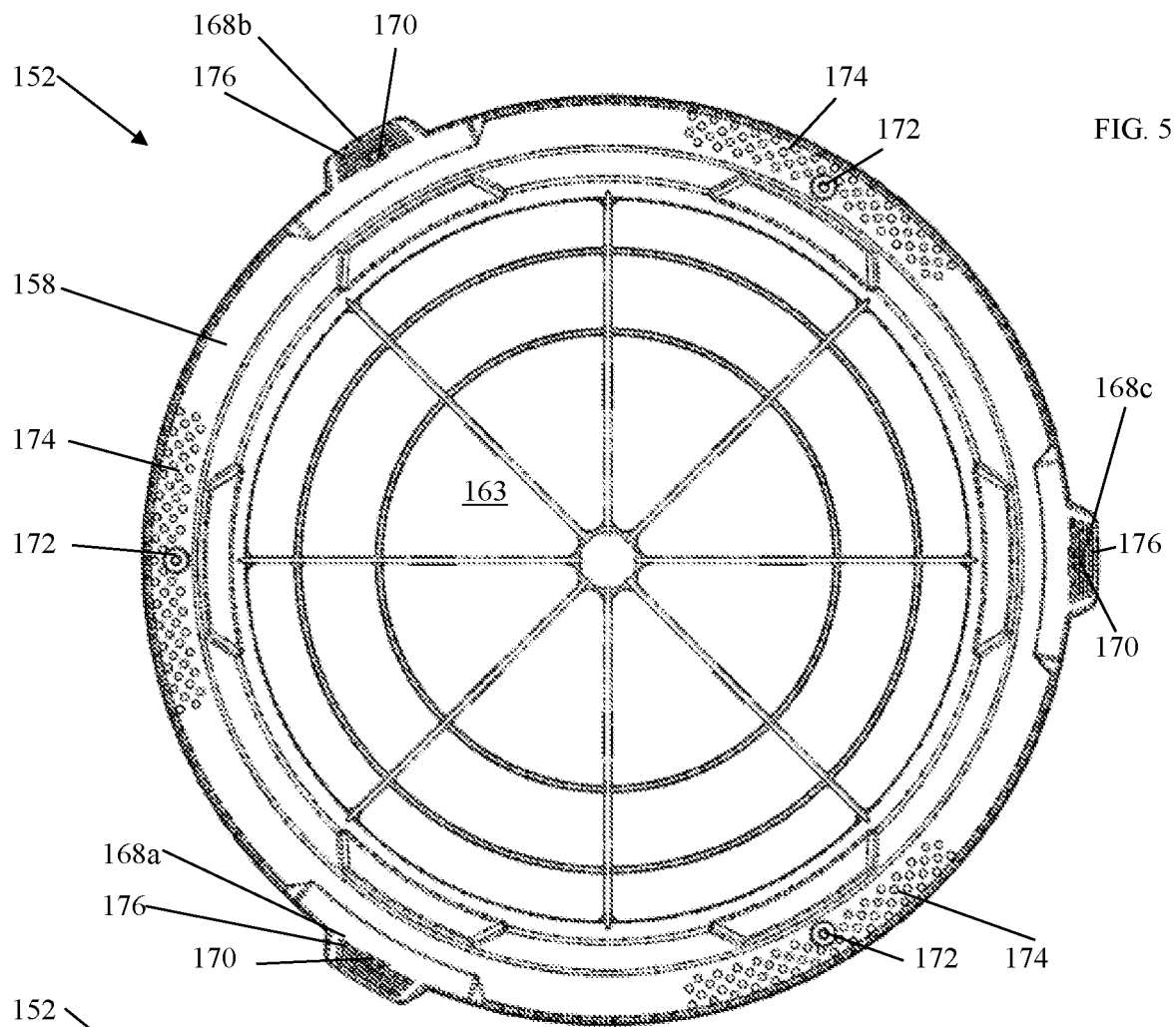
FIG. 5 shows a top view of the tank screen, as shown in FIGS. 1 and 2, in accordance with the preferred embodiment of the present invention.
Figure 6:
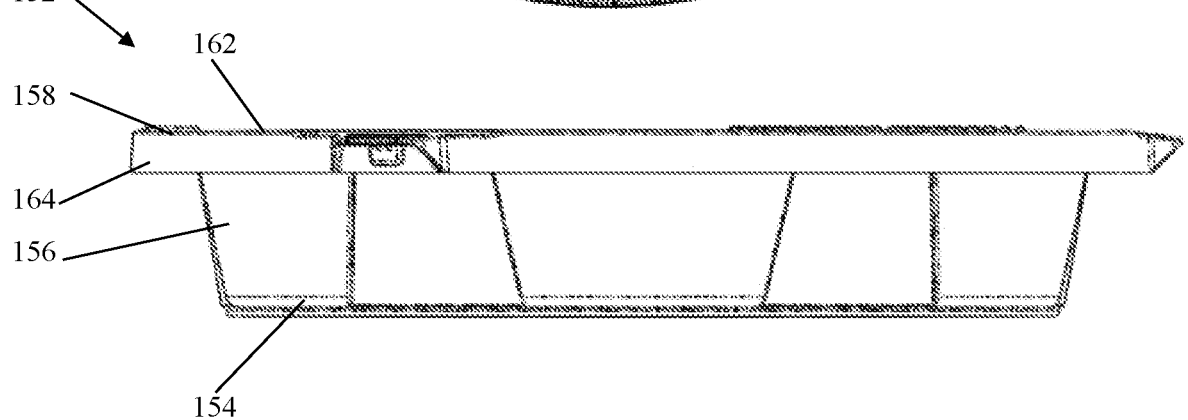
FIG. 6 shows a side view of the tank screen as shown in FIG. 5, in accordance with the preferred embodiment of the present invention.

Turning to FIGS. 5 and 6, tank screen 152 includes a base 154, at least one side wall 156 extending upwardly from base 152, and a rim 158 extending outwardly from an upper end of side wall 156. Rim 158 and a portion of side wall 156 define a channel 160 (best shown in FIGS. 1A and 2A).

In preferred embodiments, base 154 may be any particular size or shape. A skilled person would understand that the size and shape of the base substantially corresponds to the size and shape of solar shield 106. Nevertheless, in most embodiment, such as the one shown, base 154 will be substantially circular.

Base 154 includes a tank screen portion 163 adapted to allow fluid to pass through. In the preferred embodiment shown, the tank screen 163 portion is convex-shaped. Advantageously, debris caught by the tank screen portion may move to the sides of tank screen portion 163.

As can best be seen in FIG. 6, side wall 156 of tank screen 152 tapers inwardly from rim 158 towards base 154. Side wall 156 includes an outer surface for abutting the tank screen abutment portions 122 of solar shield 106.

As mentioned above, rim 158 extends outwardly from side wall 156. Rim 158 includes an outwardly extending portion 162 adapted to overlie the upper portions 118 of each first arm 110 of solar shield 106. Outwardly extending portion 162 includes a downwardly extending side wall including a lower most edge 164. As can best be seen in FIGS. 1, 1A, 2 and 2A, lower edge 164 abuts outer wall 103 of the water tank 102. Advantageously, the lower most edge of the rim may aid in locating the tank screen relative to water tank 102.

As best shown in FIG. 1A, tank screen 152 further includes solar shield engagement portions 166. In the embodiment shown, tank screen 152 includes three solar shield engagement portions. Each solar shield engagement portion 166 corresponds to a tank screen engagement portion 146. Each solar shield engagement portion 166 extends from an inner side surface of the downwardly extending wall of the rim 158 towards side wall 156.

In the preferred embodiment shown, each solar shield engagement portion 166 is in the form of an elongate protrusion having a substantially horizontal upper surface for abutting a substantially horizontal lower surface of the corresponding tank screen engagement portion. Each solar shield engagement portion 166 further includes a substantially angled lower surface. During fitting tank screen 152 to solar shield 106, each solar shield engagement portion 166 engages a corresponding tank screen engagement portion 146 causing each tank screen engagement portion to deflect inwardly allowing each solar shield engagement portion to pass over each corresponding tank screen engagement portion and allowing each solar shield engagement portion to then deflect back outwardly, thereby securing the tank screen to the solar shield, as shown best in FIGS. 1 and 1A.

Tank screen 152 further includes three tabs 160a, 168b, 168c extending outwardly from rim 158. Tabs 168a, 168b, 168c are evenly spaced around rim 158. A skilled person would understand that the number of tabs 168 corresponds to the number of solar shield engagement portions 166. Accordingly, other preferred embodiment may have more or less than three tabs.

Tank screen 152 further includes three bores 170 adapted to receive a tool. Each bore is defined by on of tabs 168. Each of bores 170 is closed ended. A skilled person would understand that the bore may be any particular size or shape. For example, in the embodiment shown, the bore is sized to receive the end of a screw driver. Advantageously, a tool may be inserted into each bore and used to lever the rim of the tank screen away from an outer surface of the solar shield, thereby allowing the screen tank engagement member to disengage from the corresponding solar shield engagement member facilitating the release of the tank screen from the solar shield.

Tank screen 152 further includes three apertures 172, each for receiving a fastener. Apertures 172 are positioned to align with apertures 142 located on solar shield 106 when the tank screen is in the second mounting orientation as shown best in FIGS. 2 and 2A. Advantageously, in preferred embodiments, the tank screen may be fastened to the solar shield using one or more fasteners, in the form of one or more screws.

Tank screen 152 further includes first tactile formations 174. Each first tactile formation 174 corresponds to one of apertures 172 for receiving a fastener. Tank screen 152 further includes second tactile formations 176. Each second tactile formation corresponds to one of bores 170 for receiving a tool. As shown best in FIG. 7, each of the first tactile formations 174 and second tactile formations 176 alternate in order around the upper surface of the rim 158.

First tactile formations 174 and second tactile formations 176 are in the form of one or more ridges or protrusions. A skilled person would understand that first tactile formations 174 and second tactile formations 176 may be any size or shape so long as the first tactile formations 174 are different from the second tactile formations 176. Advantageously, a user is able to feel via touch the orientation of the tank screen without sight.

Figure 7:
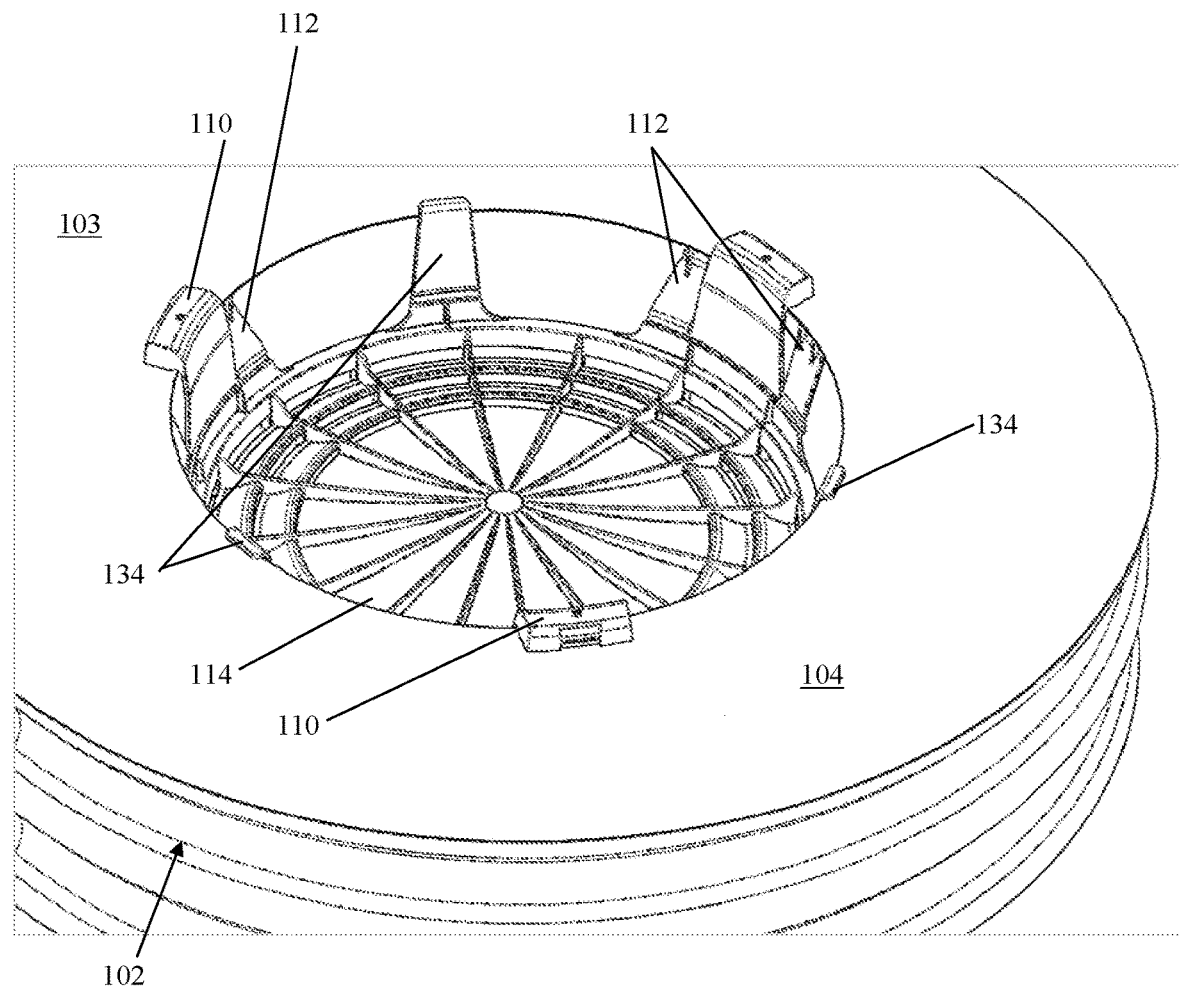
FIG. 7 shows a top perspective view from above of the solar shield, shown in FIGS. 3 and 4, attached to a water tank inlet opening, in accordance with a preferred embodiment of the present invention.
Figure 8:
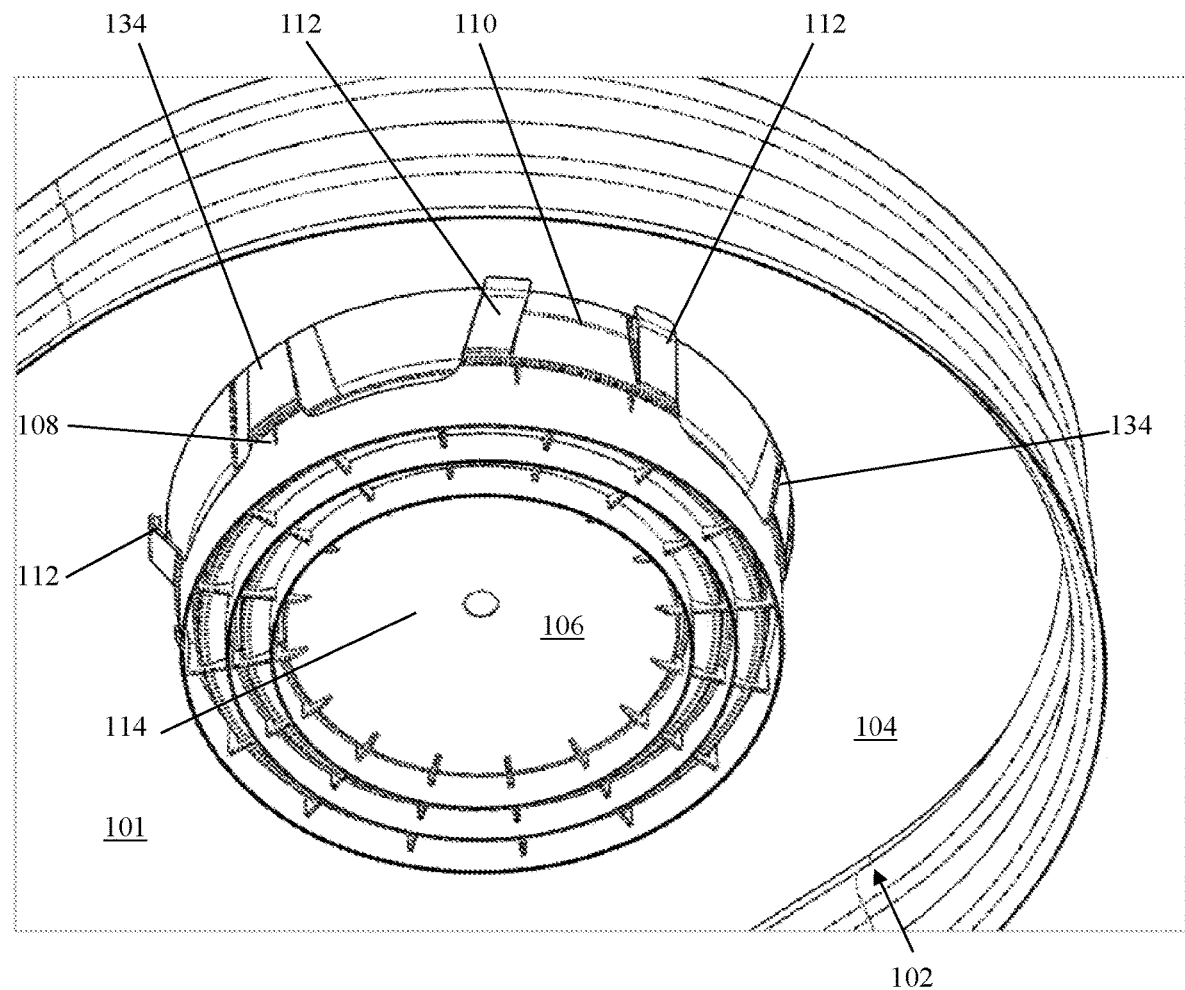
FIG. 8 shows a perspective view from below of the solar shield attached to the water tank inlet opening, as shown in FIG. 7 from above, in accordance with the preferred embodiment of the present invention.
Figure 9:
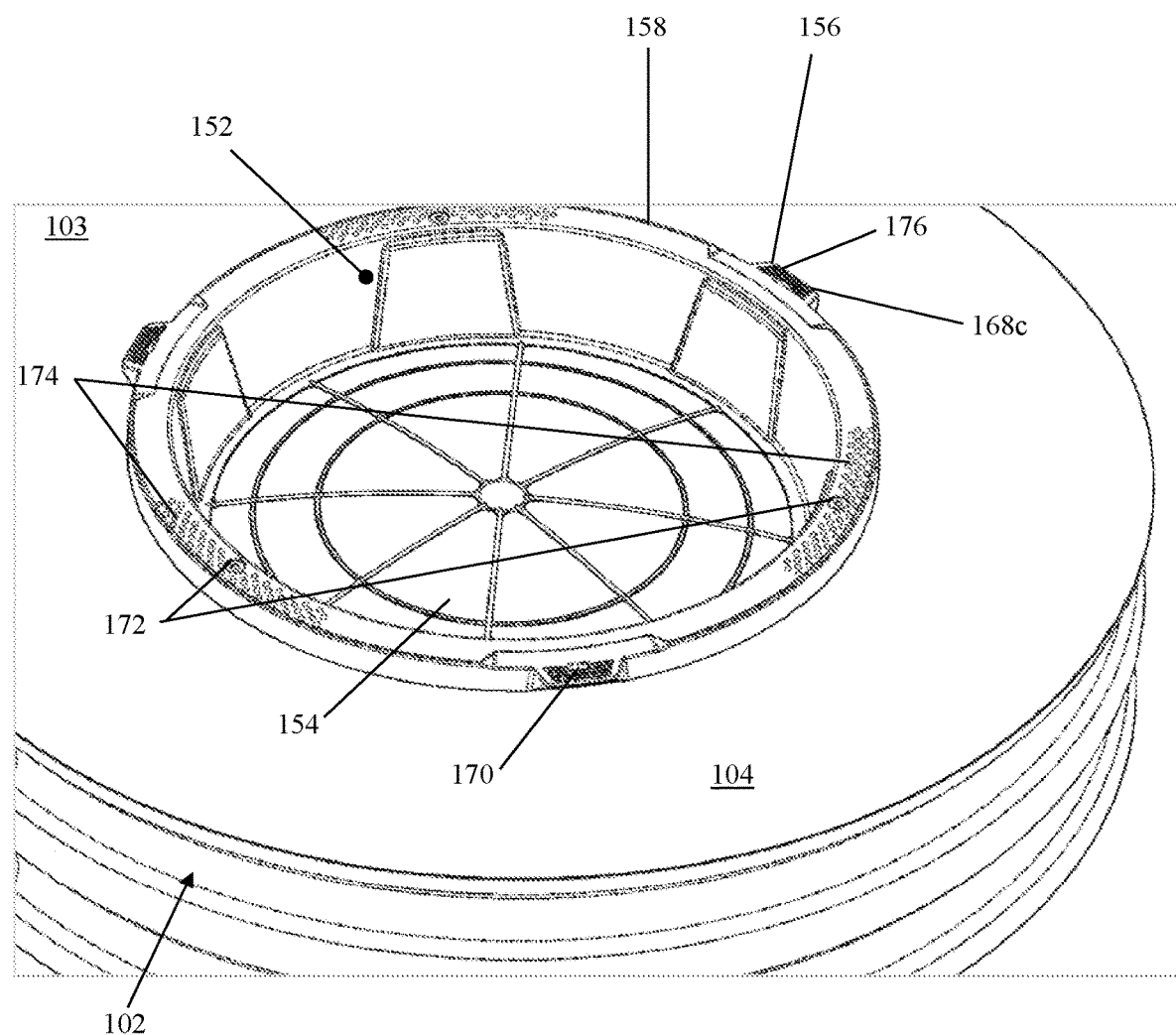
FIG. 9 shows a perspective view of the tank screen, shown in FIGS. 5 and 6, mounted to the solar shield and fitted to the tank inlet opening, in the first orientation shown in FIGS. 1 and 1A, in accordance with the preferred embodiment of the present invention.
Figure 10:
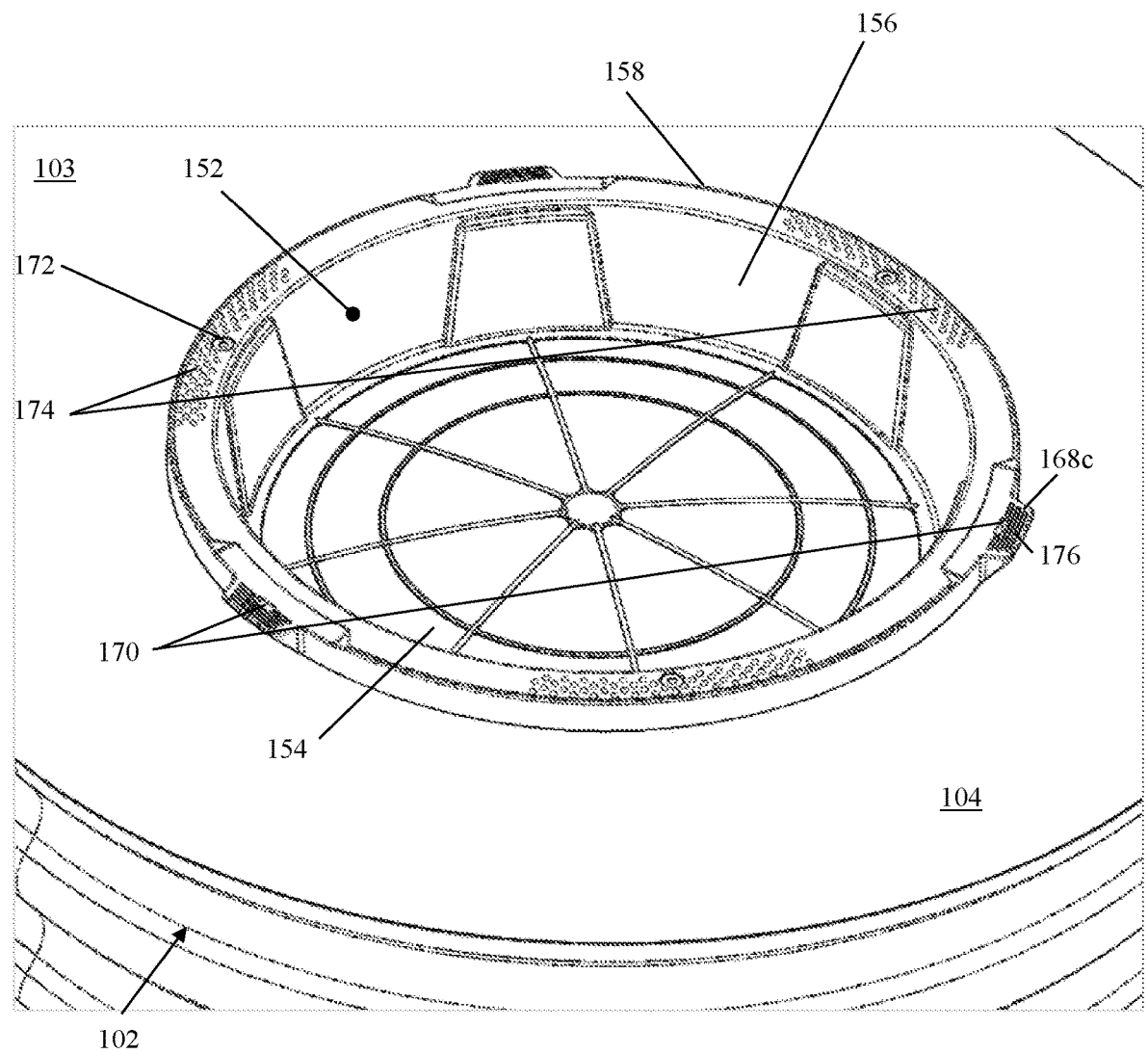
FIG. 10 shows a perspective view of the tank screen, shown in FIGS. 5 and 6, mounted to the solar shield and fitted to the tank inlet opening, in the second orientation shown in FIGS. 2 and 2A, in accordance with the preferred embodiment of the present invention.

FIGS. 7 to 10 show a preferred method of installing fitting 100 to a water tank inlet opening. In particular, FIGS. 7 and 8 show solar shield 106 mounted to the water tank inlet opening. As can be best seen in FIG. 7, the abutment surfaces of first arms 110 and the abutment surfaces of third arms 134 are abutting external surface 103 of the water tank. Further, as best shown in FIG. 8, abutment portions 132 are abutting internal surface 101 of the water tank 102. Advantageously, solar shield 106 snap fits into the inlet opening without the use of additional fasteners, joiners and/or adhesives. Further, first arms 110 and second arms 112 sandwich a portion of the wall of the water tank when fitted to the tank. Once solar shield 106 has been fitted to the inlet opening, tank screen 152 is fitting over the top, as best shown in FIGS. 9 and 10. In particular, FIG. 9 shows tank screen 152 mounted to solar shield 106 in the first orientation and FIG. 10 shows tank screen 152 mounted to solar shield 106 in the second orientation.

Another preferred embodiment of the invention, in the form of a fitting for a water tank 1001A As shown in FIGS. 11 to 25, the water tank including an inlet opening 1002 defined by an edge of the water tank. The fitting includes at mounting member 1100 for mounting to the edge of the water tank. The fitting further includes a tank screen 1200 (FIG. 14) or an inlet cover 1300 (FIG. 12) for mounting to a respective mounting member 1100a, 1100b, wherein the respective mounting member 1100a, 1100b is adapted to snap fit into the inlet opening 1002 and the tank screen 1200 or inlet cover 1300 is adapted to snap fit onto one of the mounting members 1100a, 1100b without the use of additional fasteners, joiners and/or adhesives. Similarly, the fitting may further include a solar shield 1300 (FIG. 13) that mounts to or locks to the mounting member 1100.

Figure 11:
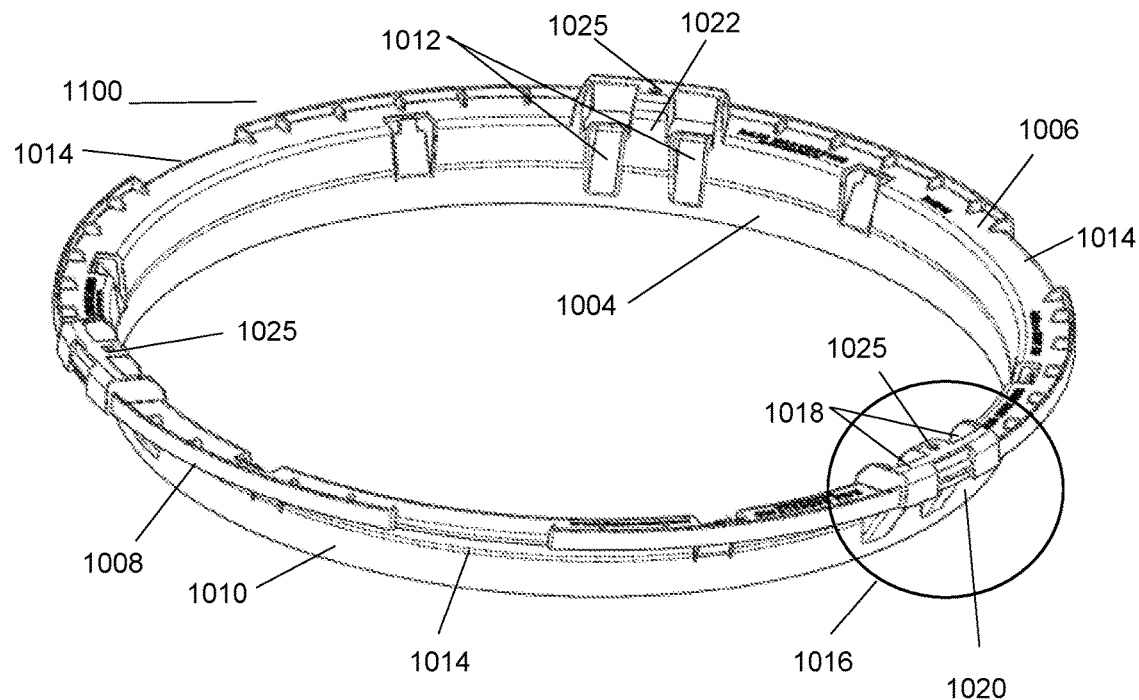
FIG. 11 shows a mounting ring in accordance with a second preferred embodiment of the present invention.

Turning to FIG. 11, each mounting member 1100 is substantially circular. Further, each mounting member 1100 is ring shaped. In the embodiment shown, mounting member 1100 is permanently mounted to the at least one edge of the water tank inlet opening 1002 as shown best in FIGS. 15, 18 and 21. In other embodiments (not shown), the mounting member is removably mounted to the water tank inlet opening 1002. Advantageously, the mounting member covers the at least one edge which is typically sharp on a steel tank.

Each mounting member 1100 includes a side wall 1004 and a flange 1006 extending from an upper edge of the side wall. Each mounting member 1100 includes an abutment surface 1008 for abutting an exterior surface of the water tank. The abutment surface forms part of a lower surface of the flange 1006. Mounting member 1100 further includes a guide surface 1010 for guiding the at least one mounting member 1100 during mounting to the inlet. In the preferred embodiment shown, side wall 1004 includes the guide surface 1010. In some embodiments, the side wall may taper outwardly in an upwards direction from a free edge and towards the flange.

Each mounting member 1100 includes multiple protrusions 1012 extending from an outer surface of the side wall. Each protrusion includes an angled side wall (best shown in FIGS. 24 and 25). Each protrusion 1012 further includes an upper abutment surface for abutting an interior surface of the water tank once mounted to the water tank inlet 1002. Advantageously, in use, each abutment surface of the flange and the upper abutment surfaces of protrusions 1012 sandwich a wall of water tank 1001 that defines the edge of water tank inlet opening 1002 once mounting member 1100 is mounted to the inlet opening in order to securing mounting member 1100 to the water tank. The protrusions 1012 function as flexible walls that extend outwardly from the downwardly extending wall 1004 of the mounting ring 1100.

In preferred embodiments, each mounting member 1100 includes one or more recesses 1014 for locating solar shield

1400. In the preferred embodiment shown, each mounting member 1100 includes three recesses 1014. Recesses 1014 are evenly spaced around a perimeter of mounting member 1100. Flange 1006 of mounting member 1100 defines recesses 1014. In the preferred embodiment shown, each recess 1014 is substantially elongate and extends around a portion of the perimeter of flange 1006. Each recess 1014 extends from an outer perimeter edge of flange 1006 and toward the centre of the mounting member 1100.

In preferred embodiments, each mounting member 1100 includes one or more locating portions 1016 for locating a tank screen 1200 or inlet cover 1300. In the preferred embodiment shown, each mounting member 1100 includes three locating portions 1016 for locating a tank screen 1200 or inlet cover 1300. The locating portions are evenly spaced around the perimeter of mounting member 1100. In some preferred embodiments, the location of each locating portion corresponds to the location of at least one protrusion 1012. In the preferred embodiment shown, the location of each locating portion 1016 corresponds to the location of each pair of protrusions 1012.

In preferred embodiments, each locating portion 1016 includes one or more locating recesses. In the preferred embodiment shown, each portion 1016 includes a pair of locating recesses 1018. Each pair of locating recesses 1018 is separated by a dividing member 1024. Each recess 1018 includes an abutment surface for abutting at least a portion of the tank screen 1200 or inlet cover 1300.

In preferred embodiments, each locating portion 1016 further includes at least one engagement portion 1020, which is similar to engagement portion 146 as described with reference to FIG. 2A. Each engagement portion 1020 may be an inlet cover 1300 engagement portion for engaging a corresponding engagement portion on the mounting member 1100 or a tank screen 1200 engagement portion for engaging a corresponding engagement portion on the tank screen 1200. The mounting ring 1100 also includes apertures 1025 that can receive screws in instances where the installer may wish to screw the mounting ring to the water tank. A different number of apertures 1025 may be provided to that as shown in FIG. 11 and the apertures 1025 may be provided in different locations, although it will be appreciated that the apertures 1025 will normally be provided in the upper surface of flange 1006.

In preferred embodiments, each tank screen 1200/inlet cover 1300 may include one or more apertures adapted to receive a fastener. In the preferred embodiment shown, each tank screen 1200/inlet cover 1300 includes three apertures 1022/1036 adapted to receive a fastener. The apertures 1022/1036 are evenly spaced around the perimeter of the mounting member 1100. Each dividing member 1024 defines an aperture 1025 in the mounting member.

Figure 13:
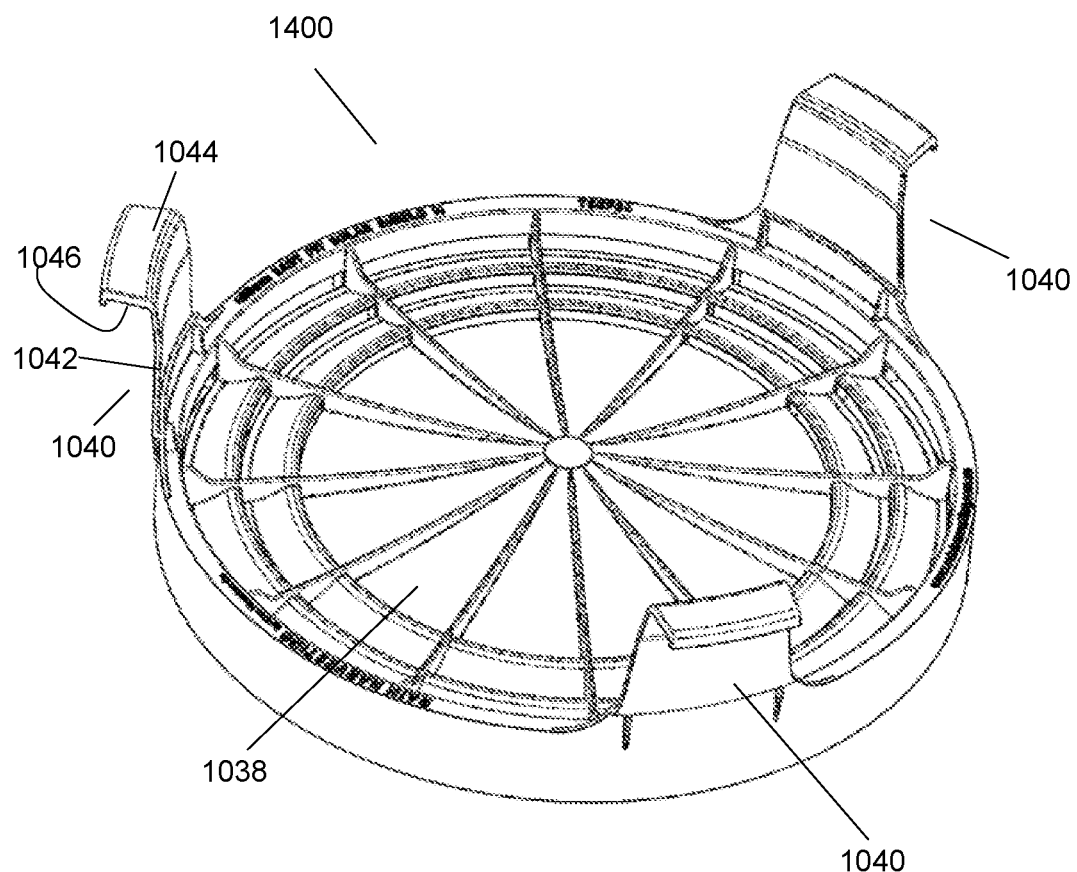
FIG. 13 shows a perspective view of a solar shield in accordance with a second preferred embodiment of the present invention.
Figure 14:
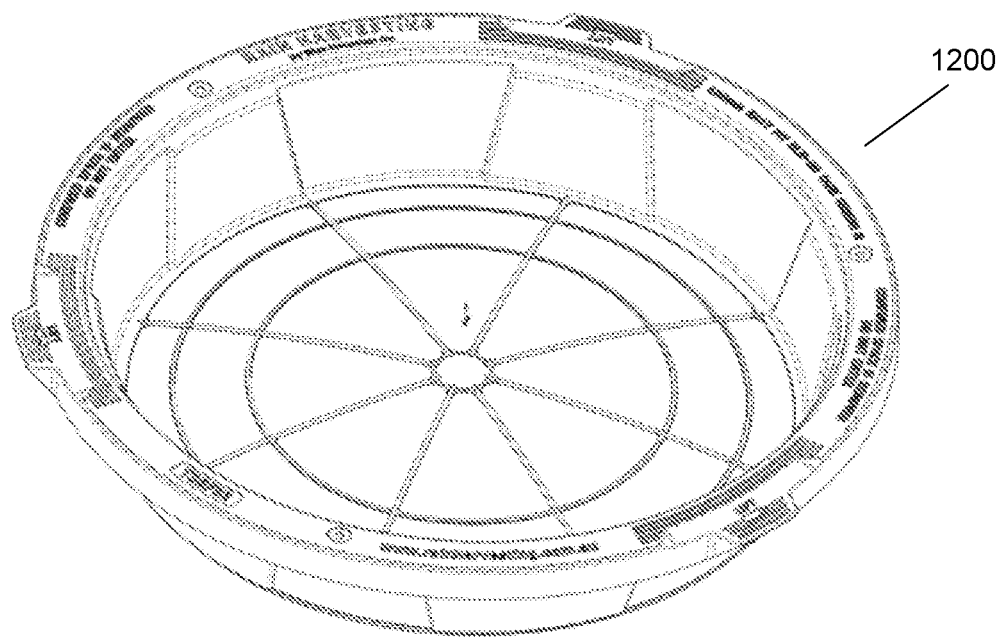
FIG. 14 shows a perspective view of a screen in accordance with a second preferred embodiment of the present invention.

Turning to FIGS. 13 and 14, the fitting includes tank screen 1200, for covering the water tank inlet opening 1002 and minimising the amount of debris allowed to enter the water tank, or inlet cover 1300. In the embodiment shown, the tank screen 1200 is mountable to the mounting member 1100 without the use of additional fasteners, adhesives or joiners. In other embodiments, the tank screen 1200 is mountable to the mounting member 1100 using fasteners, adhesives and/or joiners. Similarly, in the embodiment shown, inlet cover 1300 is mountable to the mounting member 1100 without the use of additional fasteners, adhesives or joiners. In other embodiments, inlet cover 1300 is mountable to the mounting member 1100 using fasteners, adhesives and/or joiners. In the preferred embodiment shown, the tank screen 1200 is removably mountable to the mounting member 1100.

Turning to FIG. 14, tank screen 1200 includes the features of the tank screen described with reference to FIGS. 5 and 6. The tank screen 1200 includes one or more engagement portions for mounting the tank screen to mounting member 1100.

Figure 12:
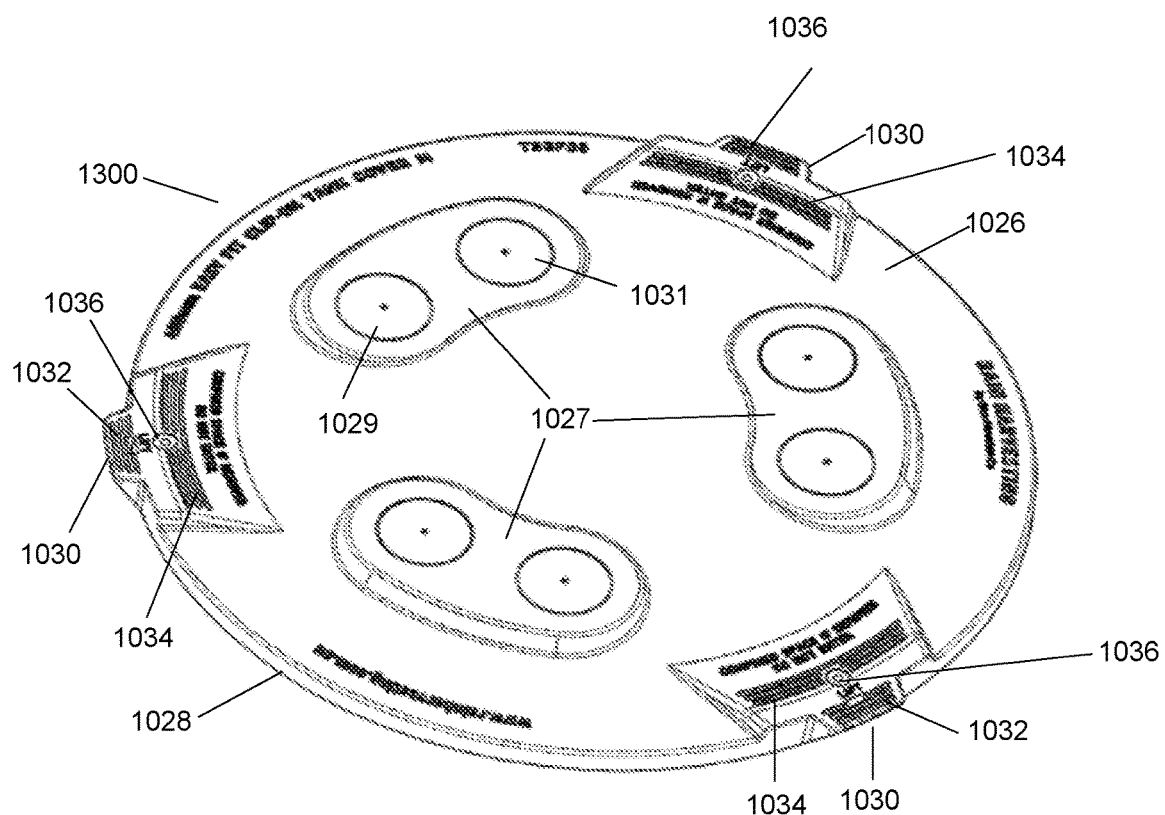
FIG. 12 shows a perspective view of an inlet cover for use with a second preferred embodiment of the present invention.

Turning to FIG. 12, in some embodiments, the fitting includes an inlet cover 1300. The inlet cover 1300 is substantially circular. The inlet cover 1300 includes at least one upper wall 1026 which is substantially solid. Advantageously, when inlet cover 1300 is mounted to a mounting member 1100, entry of water, debris or insects though the mounting member 1100 is prevented and hence entry through the inlet of the tank to which mounting member 1100 is mounted is also prevented.

Inlet cover 1300 includes a downwardly extending side wall 1028. The downwardly extending side wall extends around the perimeter of upper wall 1026. The downwardly extending side wall includes an inner facing surface.

In preferred embodiments, the inlet cover 1300 includes one or more engagement portions, each for engaging a corresponding engagement portion on the mounting member 1100. Each engagement portion is the same as the engagement portions on the tank screen as described with reference to FIGS. 5 and 6 above. Each engagement portion extends inwardly from the inwardly facing surface of the side wall 1028 extending from upper wall 1026. Advantageously, inlet cover 1300 may be mounted to the mounting member 1100 when the tank screen 1200 is not.

In preferred embodiments, the inlet cover 1300 further includes at least one or more tabs similar to tabs 160a, 168b, 168c as described above. In the preferred embodiment shown, the inlet cover 1300 includes three tabs 1030 evenly spaced apart around a perimeter of the cover. Each of the tabs 1030 extends from a rim of upper wall 1026 of the inlet cover 1300.

In preferred embodiments, the inlet cover 1300 includes at least one or more bores, the same or similar to the one or more bores as described in relation to the tank screen 1200 above, for receiving a tool. In the embodiment shown, the inlet cover 1300 includes three bores 1032, each bore 1032 being defined by a portion of one of tabs 1030.

In the preferred embodiments, the inlet cover 1300 includes one or more apertures, the same or similar to the one or more apertures as described in relation to the tank screen 1200 above, for receiving a fastener. In the embodiments shown, the inlet cover 1300 includes three apertures 1036. Each aperture 1036 corresponds to an aperture 1025 in the mounting member 1100 such that when mounted to the mounting member 1100, each aperture 1036 for receiving a fastener in the inlet cover 1300 corresponds to an aperture 1025 for receiving a fastener in the mounting member 1100. Advantageously, in use, one or more fasteners may be used to fasten the inlet cover 1300 to the mounting member 1100. Alternatively, the mounting ring 1100 can be screwed to the water tank and the cover can be clipped to the mounting ring. Alternatively, the mounting ring 1100 may have additional apertures 1025 that allow the mounting ring 1100 to be screwed to the water tank and aligned apertures 1025 that allow the cover 1300 to be screwed to the mounting ring.

In preferred embodiments, the inlet cover 1300 includes one or more tactile portions as described in relation to the tank screen described with reference to FIGS. 5 and 6. Each tactile portion 1034 corresponds to one of bores 1032, apertures 1036, tabs 1034 or any combination thereof. In the preferred embodiment shown, each tactile portion 1034 is in the form of a plurality of ridges. The plurality of ridges are spaced apart from one another.

The top wall 1026 of the cover 1300 includes regions 1027. The regions 2017 may be raised regions. In the embodiment shown in FIG. 12, the cover has 3 regions 2017. Each region 1027 has two regions 1029, 1031 that are defined by circular lines of weakness or lines of reduced wall thickness. The regions 1029, 1031 enable an installer to cut out circular holes in the top wall 1026 for passage of a pressure pipe and a power cable for a submersible pump located inside the water tank. Grommets (to be described hereunder) may be fitted to the holes thus made. By providing a number of regions 1027 (three are shown in FIG. 12), the installer can choose the most appropriate region in which to cut holes to most easily facilitate installation of the pressure pipe and power cable.

In another embodiment, the inlet cover 1300 may include one or more areas of weakness (not shown). Each area of weakness will form part of the upper wall 1026. Each area of weakness will be, or will substantially be, circular. In preferred embodiments, each area of weakness will be in the form of one or more recesses. In preferred embodiments, each recess will extend downwardly from upper surface 1026 of the upper wall but not extend through the upper wall. Advantageously, each area of weakness may be easily cut out to allow for installation of cables, pipes or the alike.

Figure 16:
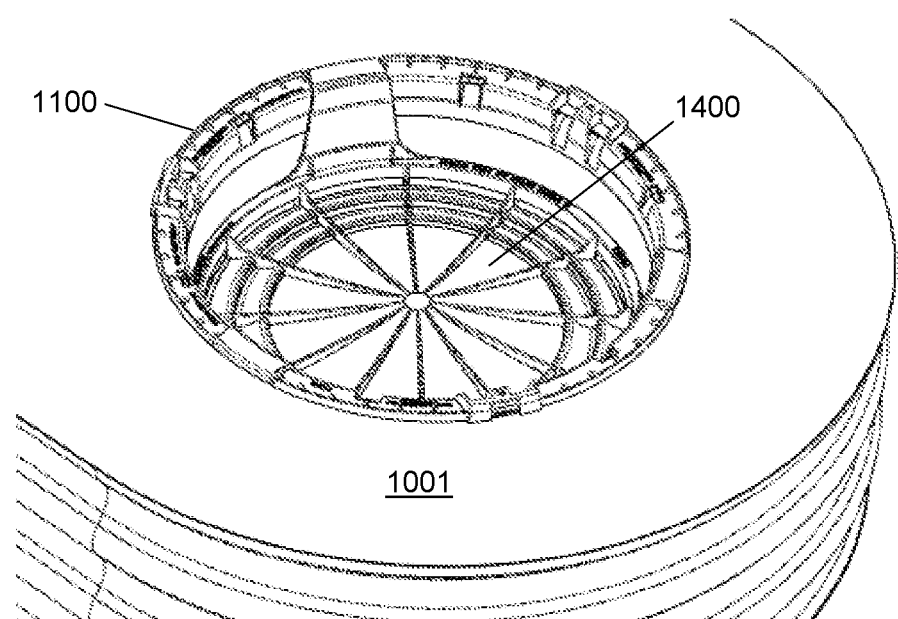

The fitting 1000 may further include a solar shield 1400 as best shown in FIG. 13. The solar shield 1400 includes a base 1038. The solar shield 1400 is generally similar to the solar shield as described above with reference to FIGS. 1 to 4. In use, at least a portion of the solar shield 1400 rests upon a portion of the at least one mounting member 1100, as best shown in FIG. 16.

In preferred embodiments, the solar shield 1400 includes at least one upwardly extending arm. In the preferred embodiment shown, the solar shield 1400 includes three upwardly extending arms 1040. The upwardly extending arms 1040 are evenly spaced around a perimeter of base 1038. The location of each upwardly extending arm around the base will correspond to the location of the recesses 1014 of mounting member 1100. As can be seen in FIG. 13, each arm 1040 is substantially hook-shaped. In preferred embodiments, such as the one shown, the size and shape of a portion of each upwardly extending arm corresponds to the size and shape of a corresponding recess 1014 of the mounting member 1100. In preferred embodiments, each upwardly extending arm 1040, or at least a portion of the upwardly extending arm, is resiliently formed.

Each upwardly extending arm 1040 includes a side wall 1042 extending upwardly from base 1038 and an outwardly extending flange 1044 extending from an upper end of the side wall. Each outwardly extending flange 1044 and/or side wall 1042 is resilient. Each outwardly extending flange 1044 is substantially L-shaped. Each outwardly extending flange 1044 and at least a portion of the side wall 1042 together define a space or channel 1046 for receiving a portion of mounting member 1100. During mounting of solar shield 1400 to mounting member 1100, each at least one outwardly extending flange 1044 deflects outwardly such that a portion of the mounting member 1100 enters the space 1046 defined by at least a portion of the side wall 1042 and outwardly extending flange 1044 of each arm 1040. In use, each outwardly extending flange 1044 may overlie at least a portion of flange 1006 as best shown in FIG. 16 and the downwardly extending outer lip of flange 1044 suitably rests over and engages with the outer edge of the flange 1006 of the mounting member 1100 so that the solar shield 1400 clips to the mounting member 1100. It will be noted that although the solar shield 1400 shown in FIG. 13 is generally similar to the solar shield shown in FIGS. 1 to 4, the solar shield 1400 omits the second arms 112 of the solar shield shown in FIGS. 1 to 4, with the springiness of arms 1040 and the channels 1046 being sufficient to mount the solar shield 1040 to the mounting ring 1100.

In some embodiments, the solar shield 1400 may include one or more protrusions. In particular, the solar shield 1400 may include three protrusions on each outwardly extending flange 1044. Each one or more protrusions may be any particular size or shape suitable for aiding in deflecting an upwardly extending arm. In the preferred embodiment shown, however, each protrusion is an elongate ridge extending upwardly from upper surface of each flange 1044. Advantageously, each protrusion may be grasped or handled so that it can be used to deflect the side wall of each arm inwardly such that the portion of the mounting member received within the space defined by at least a portion of the side wall and outwardly extending flange of each arm is released. This assists in releasing the solar shield 1400 from the mounting member 1100, for example, to clean or replace the solar shield.

Figure 15:
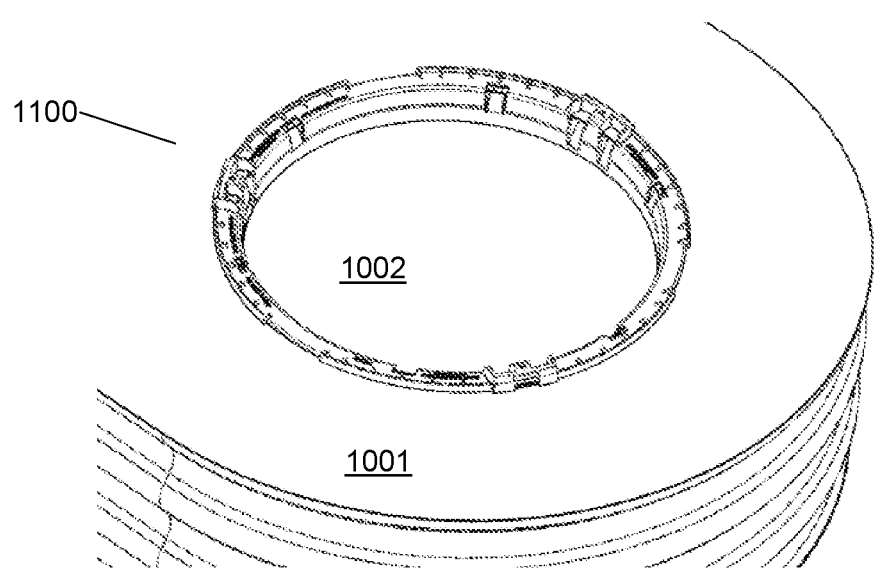
FIGS. 15 to 17 show a mounting ring, solar shield and tank screen assembly when mounted to a water tank inlet in accordance with the second preferred embodiment of the present invention.
Figure 17:
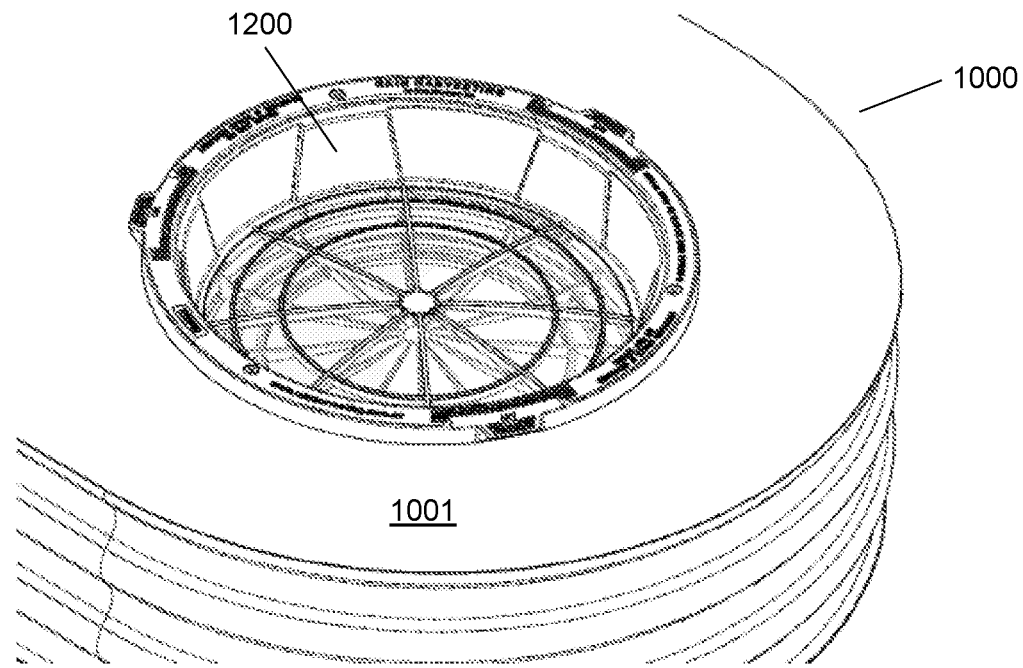

Turning to FIGS. 15 to 17, these figures show the order for assembling fitting 1000 to a water tank inlet opening. As can be seen in FIG. 16, mounting member 1100 is first mounted to an edge defining the inlet opening of the water tank. Solar shield 1400 is then optionally mounted to mounting member 1100. Solar shield 1400 may either be rested upon mounting member 1100 or secured via snap fitting flanges 1044 around at least a portion of rim 1006. FIG. 17 shows tank screen 1200 being secured over the top of mounting member 1100. In another embodiment, the tank screen 1200 may be fitted to the mounting member 1100 without requiring the solar shield to be first fitted to the mounting member 1100. The tank screen may be fitted to the solar shield using similar fitments as shown in FIGS. 1, 1A, 2 and 2A. The tank screen may be fitted to the mounting member using similar fitments as shown in FIGS. 1, 1A, 2 and 2A, by providing the mounting member with fitments that are similar to the fitments used to mount the tank screen to the solar shield as shown in FIGS. 1, 1A, 2 and 2A.

Figure 18:
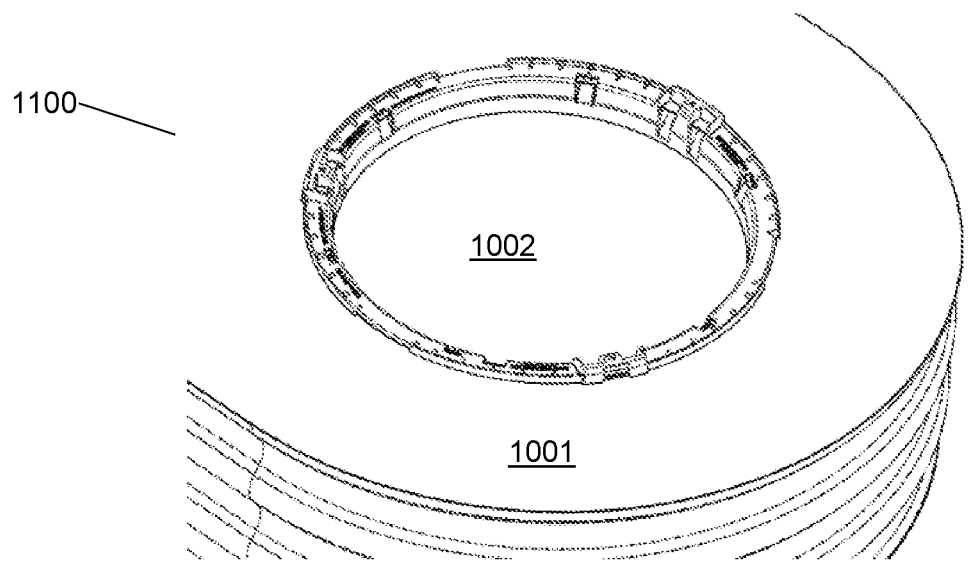
FIGS. 18 to 19 show a mounting ring and inlet cap assembly when mounted to a water tank inlet in accordance with the second preferred embodiment of the present invention.
Figure 19:
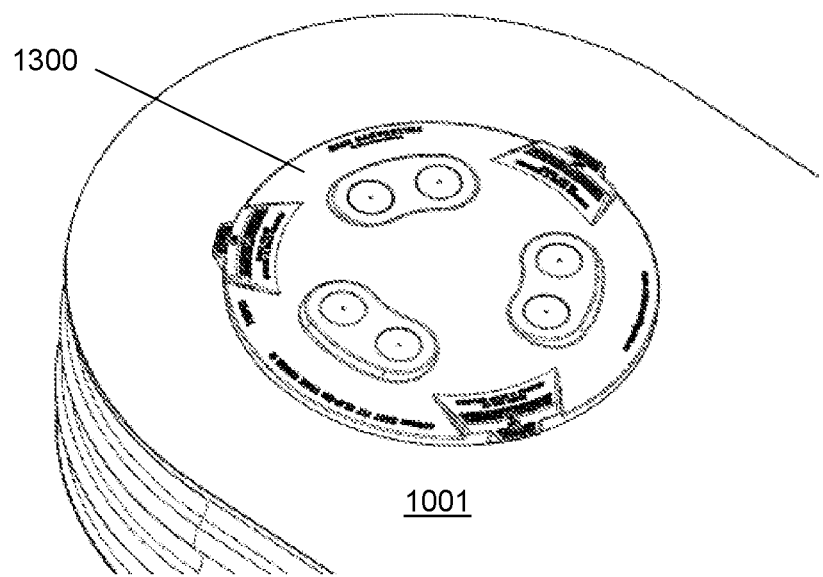

Turning to FIGS. 18 to 19, these figures show an order for assembling fitting 1000 to another water tank inlet. As can best be seen in FIG. 18, mounting member 1100 is first mounted to an edge defining the inlet opening, then inlet cover 1300 is secured to mounting member 1100.

Figure 20:
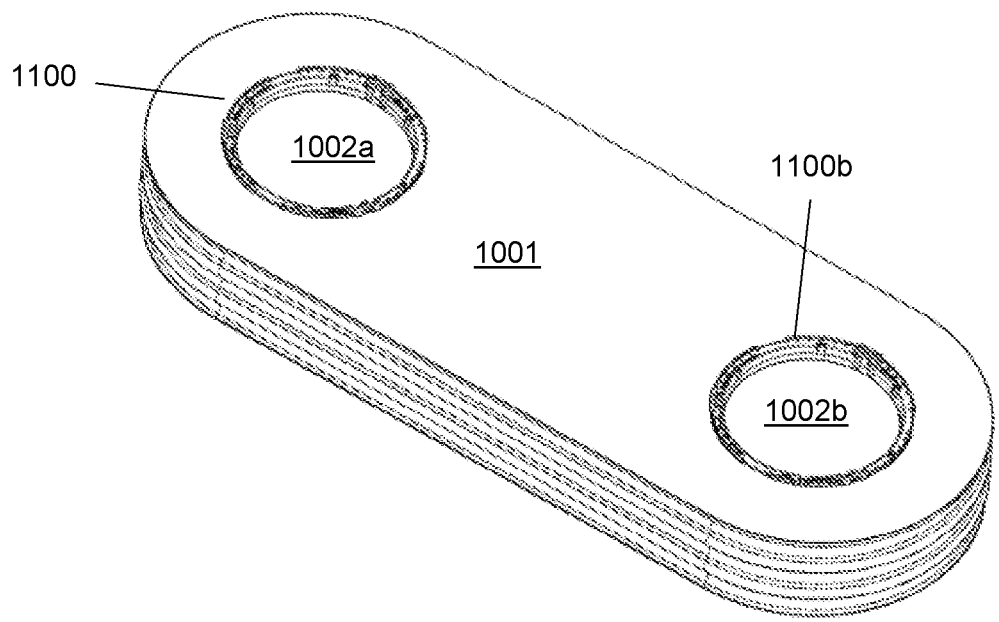
FIGS. 20 to 22 show a mounting ring, solar shield and tank screen mounted to a first inlet and a mounting ring and inlet cap assembly mounted to a second inlet in accordance with the second preferred embodiment of the present invention.
Figure 21:
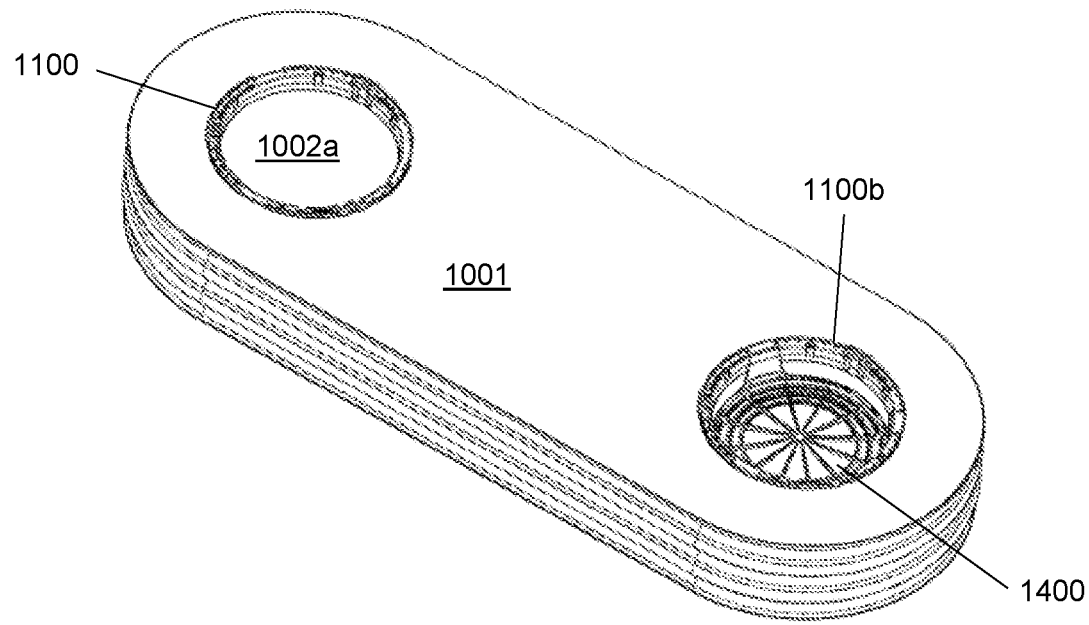
Figure 22:
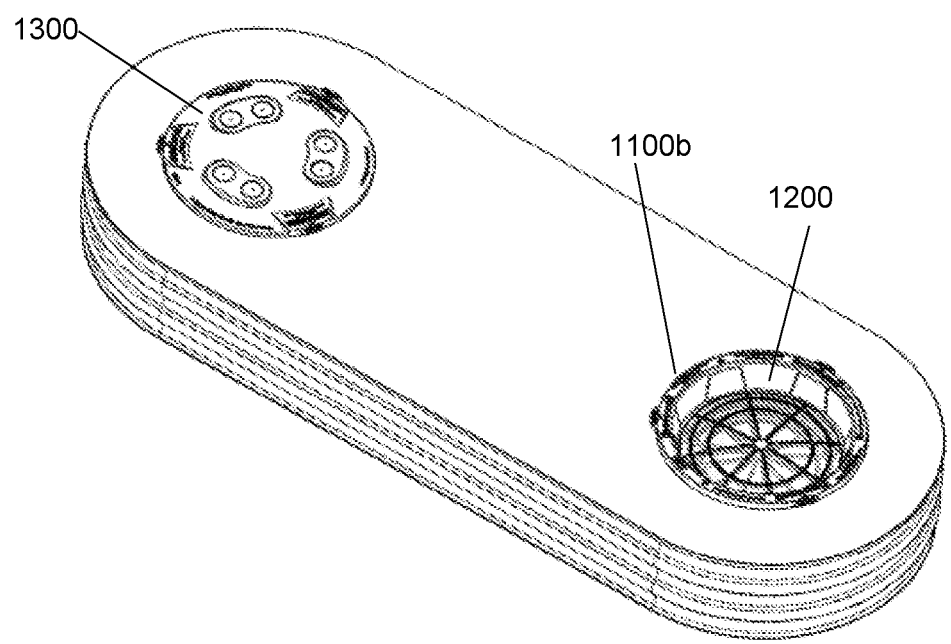
Figure 23:
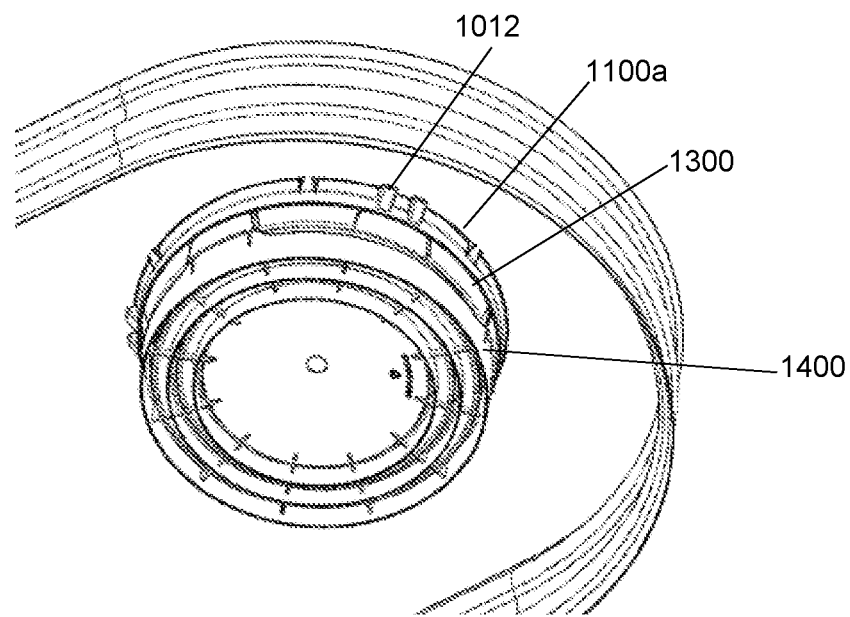
FIG. 23 shows a mounting ring, solar shield and tank screen assembly mounted to a tank inlet from below in accordance with the second preferred embodiment of the present invention.
Figure 24:
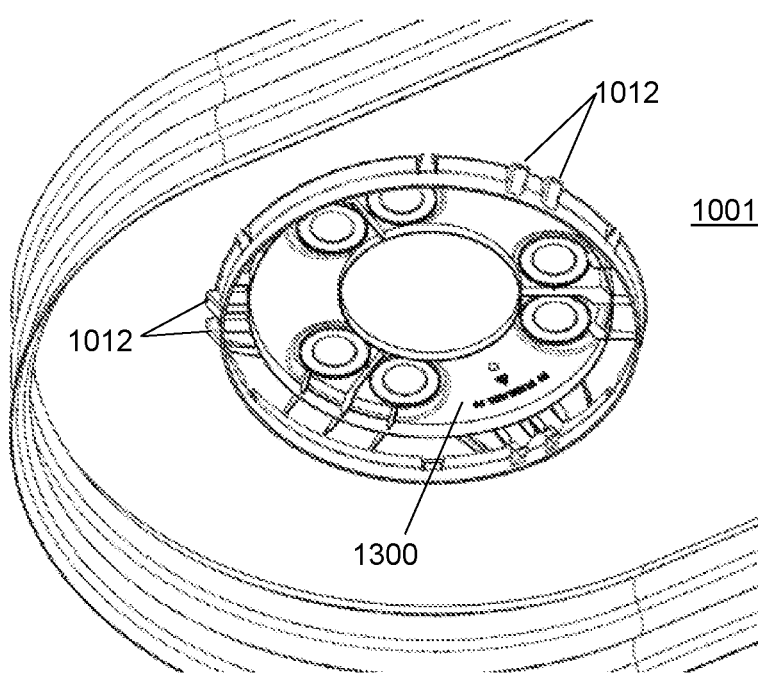
FIG. 24 shows a mounting ring and inlet cap assembly mounted to a tank inlet from below in accordance with the second preferred embodiment of the present invention.

FIGS. 20 to 22 show a water tank including duel inlet openings 1002a and 1002b. FIGS. 20 to 22 show the same mounting process as described above in relation to FIGS. 15 to 17 (to inlet 1002b) and FIGS. 18 to 19 (to inlet 1002a). FIG. 23 further shows fitting 1000 including mounting member 1100, solar shield 1400 and tank screen 1300 when mounted to inlet 1002b from below. FIG. 24 shows fitting 1000 including mounting member 1100 and inlet cover 1300 when mounted to inlet 1002a from below.

FIGS. 25 to 27 show various views of a grommet 1600 suitable for use in embodiments of the present invention. The grommet 1600 is to be made from rubber, such as a synthetic rubber or natural rubber, or a soft and flexible polymer material. The grommet 1600 has an annular outer region 1602 and a top wall 1604. The top wall 1604 has a small opening 1606 formed therein and a plurality of lines 1608 formed therein. The lines 1608 are arranged in a radial pattern emanating from the centre of the top 1604. Guidelines 1610 and 1612 are formed in the top and bottom, respectively, of the annular outer region 1602. As best shown in FIG. 27, an annular channel 1614 extends around the annual region of the grommet 1600.

Figure 28:
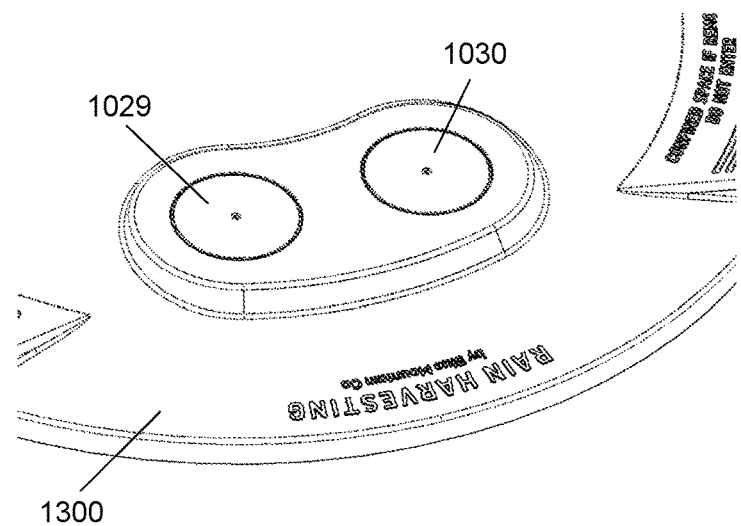
FIG. 28 shows a perspective view of the regions of the tank cover 1300 with the cut-out regions ready to be removed.
Figure 29:
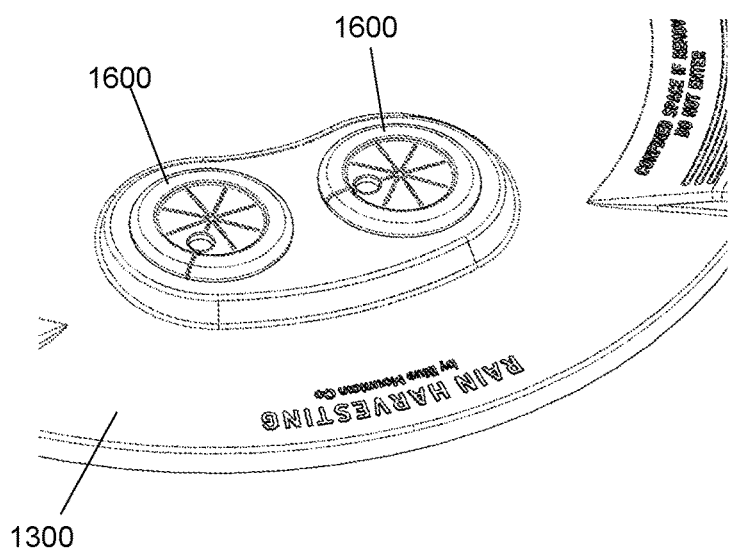
FIG. 29 shows the grommets fitted to the holes cut into the top of the tank cover.

In order to allow a submersible pump to be properly fitted to the water tank, a cover 1300 is mounted to a mounting ring 1100 which, is itself, mounted to the top of the water tank. As then shown in FIG. 28, the regions 1029, 1031 that are each delineated by a circular line of weakness or reduced wall thickness are removed, for example, by using a cutting saw or by using a hole cut drill. Grommets 1600 are then fitted to the holes thus formed. This is shown in FIG. 29. In particular, the annular channels 1614 of the grommets 1600 receive the respective edges of the holes when the grommets 1600 are positioned in the holes. As the grommets are made from a rubber material from a soft and flexible polymer material, the grommets can form a seal around the hole.

Prior to fitting the grommet 1600 to the hole 1606 that is designed to receive the power cable of the submersible pump, the annular rim of the grommet 1600 is cut along guidelines 1610, 1612 so that a cut extends from the hole 1606 to the outside edge of the grommet. The power cable of the submersible pump can then be slid through the opening created by that cut, with the power cable then being snugly received in the opening 1606. The grommet can then be fitted to the hole that has been cut in the top of the water tank cover 1300. After insertion, the grommet can be rotated to the best position for the cable. It is noted that the cable hole 1606 is off to one side of the grommet 1600 so that no gap can open up around the power cable to allow mosquitoes into the water tank. As the hole is off to one side of the grommet 1600, the cut edge of the grommet 1600 is jammed closed after pushing the grommet into the hole that has been cut in the cover.

In order to fit a pressure pipe for the submersible pump, the installer will cut along the radial guidelines 1608 in the top wall 1604 of the grommet 1600. The annular rim 1602 of the grommet is not cut. By cutting along the radial guidelines 1608, a series of flaps or triangles are formed in the top wall 1602 of the grommet. The grommet can then be inserted into the hole that has been cut into the top wall of the tank cover 1300. The pipe for the submersible pump can then be pushed through the grommet. This causes the flaps or triangles to flex downwardly out of the way whilst also leaving no gaps around the outside of the pressure pipe. This prevents mosquitoes entering the water tank. For smaller diameter pipes, the installer can slit the top wall of the grommet a lesser distance along the guidelines, which creates small flaps and a smaller effective opening.

Figure 30:
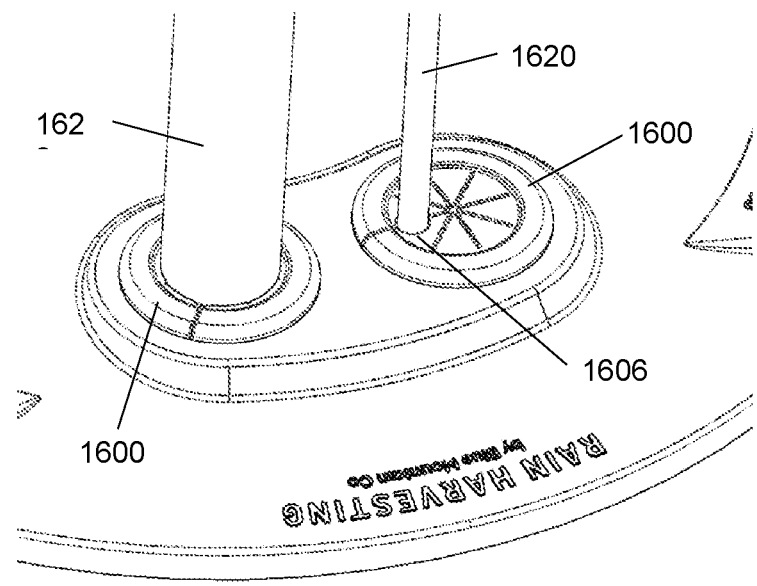
FIG. 30 shows a pressure pipe and a power cable inserted through the grommets.

FIG. 30 shows a power cable 1620 inserted through the opening 1606 in one grommet and a pressure pipe 1622 inserted through the opening formed in the top wall of grommet by way of cutting along the guidelines 1608. Use of the grommets in this manner facilitates formation of a mosquito proof mounting of the power cable and pressure pump for a submersible pump inside the tank.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A fitting for a water tank including at least one inlet opening defined by at least one edge of the water tank, the fitting including:
   at least one mounting member for mounting to the at least one edge of the water tank; and
   a water tank screen for mounting to one of the at least one mounting member, wherein the water tank screen comprises a) a base that rests below the at least one edge of the water tank when the water tank screen is mounted to the mounting member, and b) a plurality of arms, wherein each arm comprises a lower portion that extends vertically from the base, and an upper portion that extends perpendicularly and outwardly relative to the lower portion and overlies an external surface of the water tank,
   wherein each mounting member is adapted to be mounted into the inlet opening of the water tank and the water tank screen is adapted to be mounted onto one of the at least one mounting members without the use of additional fasteners, joiners and/or adhesives.

2. The fitting as claimed in claim 1, wherein the mounting member is mounted into the inlet opening by snap fitting, by virtue of a friction fit, by provision of gripping teeth on the side wall of the inlet, by a combination of a screw and complementary thread on one of the inlet of the water tank and the complementary part on the mounting member or by a clip arrangement.

3. The fitting as claimed in claim 2, wherein the mounting member is provided with a snap-fit mechanism that engages with the water tank when the mounting member is inserted into the inlet of the water tank.

4. The fitting as claimed in claim 1, wherein the mounting member is mounted to the water tank by use of fasteners or screws, or by use of an adhesive.

5. The fitting as claimed in claim 4, wherein the water tank screen is provided with a snap-fit mechanism that engages with the mounting member when the water tank screen or inlet cover is inserted into the mounting member.

6. The fitting as claimed in claim 1, wherein the water tank screen is adapted to be mounted into the mounting member by snap fitting, by virtue of a friction fit, by provision of gripping teeth on the side wall of the mounting member, by a combination of a screw and complementary thread on one of the mounting member and the complementary part on the water tank screen or inlet cover.

7. The fitting as claimed in claim 1, wherein the at least one mounting member is substantially circular or ring shaped.

8. The fitting as claimed in claim 1, wherein the at least one mounting member includes at least one side wall and at least one flange extending from the at least one side wall, the flange extending from an upper edge of the at least one side wall.

9. The fitting as claimed in claim 1, wherein the mounting member includes a surface that overlies an outside surface of the water tank, the surface of the mounting member receiving one or more fasteners to fix the mounting member to the water tank or an adhesive located between the surface of the mounting member and the outer surface of the water tank fixing the mounting member to the water tank.

10. The fitting as claimed in claim 1, wherein the mounting member has an opening for receiving a fitting for a water tank, the fitting comprising a base portion that, in use, is located in an inner volume of the water tank, the fitting being mounted in the water tank by inserting the base of the fitting through the opening of the mounting member into the water tank inlet, wherein the fitting is adapted to be mounted into the mounting member without the use of additional fasteners, joiners and/or adhesives.

11. The fitting as claimed in claim 1, wherein the mounting member comprises a mounting ring having an annular region, a flange that, in use, overlies an outer surface of the water tank, a downwardly extending wall, one or more flexible arms extending outwardly from the downwardly extending wall, wherein when the mounting ring is inserted into the inlet of the water tank, the one or more flexible arms flex inwardly due to contact with the inlet and spring outwardly once an upper end of the one or more flexible arms is within the water tank such that a wall of the inlet of the water tank is located between the upper end of the one or more flexible arms and the flange to thereby mount the mounting ring to the water tank.

12. The fitting as claimed in claim 11, wherein the mounting ring has one or more apertures in the flange to accept fasteners, such as screws, to mount the mounting ring to the water tank in instances where the inlet of the water tank does not allow the one or more flexible arms to mount the mounting ring to the inlet.

13. The fitting as claimed in claim 1, wherein the water tank screen may include a base, at least one upwardly extending arm, each arm being substantially hook-shaped and resilient.

14. The fitting as claimed in claim 13, wherein the size and shape of at least a portion of each upwardly extending arm corresponds to the size and shape of one or more solar shield recesses of the mounting member.

15. The fitting as claimed in claim 13, wherein each upwardly extending arm includes a side wall extending upwardly from the solar shield base and an outwardly extending flange extending from an upper end of the side wall, each outwardly extending flange and at least a portion of the side wall defining a space for receiving a portion of the mounting member such that during mounting of the water tank screen to the mounting member, each at least one outwardly extending flange deflects outwardly such that a portion of the mounting member enters the space or channel defined by at least a portion of the side wall and outwardly extending flange of each arm.

16. The fitting as claimed in claim 1, wherein the water tank screen comprises a base, at least one side wall extending upwardly from the base, and a rim extending outwardly from an upper end of the at least one side wall, the rim and at least a portion of the at least one side wall defining a channel, the rim enabling the water tank screen to be snap-fit to the mounting member.

17. The fitting as claimed in claim 16, wherein the water tank screen has a rim extending outwardly from the water tank screen side wall, the rim including an outwardly extending portion adapted to overlie at least a portion of the upper portion of each first arm of the water tank screen, the outwardly extending portion including a downwardly extending side wall including a lower most edge, the water tank screen further including one or more engagement portions for engaging a corresponding engagement portion on at least the water tank screen.

18. The fitting as claimed in claim 17, wherein each engagement portion extends from an inner side surface of the downwardly extending wall of the rim of the water tank screen.

19. The fitting as claimed in claim 18, wherein each engagement portion include a substantially horizontal upper surface for abutting a substantially horizontal lower surface of the corresponding water tank screen engagement portion.

20. A method for fitting a fitting to a water tank, the water tank including at least one inlet opening defined by at least one edge of the water tank, the method comprising
mounting at least one mounting member to the at least one inlet of the water tank; and
mounting a water tank screen or an inlet cover or a solar shield to one of the at least one mounting member, wherein the water tank screen comprises a) a base that rests below the at least one edge of the water tank when the water tank screen is mounted to the mounting member, and b) a plurality of arms, wherein each arm comprises a lower portion that extends vertically from the base, and an upper portion that extends perpendicularly and outwardly relative to the lower portion and overlies an external surface of the water tank
wherein each mounting member is adapted to be mounted into the inlet opening of the water tank and the water tank screen or inlet cover or solar shield is adapted to be mounted onto one of the at least one mounting members without the use of additional fasteners, joiners and/or adhesives.

21. The method as claimed in claim 20, wherein the mounting member is mounted to the inlet without the use of additional fasteners, joiners and/or adhesives.

22. The method as claimed in claim 20, wherein the mounting member is mounted to the inlet using fasteners, such as screws, or by an adhesive.

* * * * *